(12) United States Patent
Huang et al.

(10) Patent No.: US 12,537,230 B2
(45) Date of Patent: Jan. 27, 2026

(54) ELECTRODE ASSEMBLY, MANUFACTURING METHOD AND MANUFACTURING SYSTEM OF SAME, BATTERY CELL, AND BATTERY

(71) Applicant: CONTEMPORARY AMPEREX TECHNOLOGY (HONG KONG) LIMITED, Hong Kong (CN)

(72) Inventors: Siying Huang, Ningde (CN); Jinlong Liu, Ningde (CN); Yaohui Wang, Ningde (CN); Qifan Zou, Ningde (CN); Hengshan Mao, Ningde (CN); Liangbiao Lin, Ningde (CN); Yinxiang Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 895 days.

(21) Appl. No.: 17/843,370

(22) Filed: Jun. 17, 2022

(65) Prior Publication Data

US 2022/0320596 A1   Oct. 6, 2022

Related U.S. Application Data

(63) Continuation of application No. PCT/CN2021/075166, filed on Feb. 4, 2021.

(51) Int. Cl.
*H01M 10/0587* (2010.01)

(52) U.S. Cl.
CPC .... *H01M 10/0587* (2013.01); *H01M 2220/20* (2013.01)

(58) Field of Classification Search
CPC ........... H01M 10/0587; H01M 10/125; H01M 10/0431; H01M 10/286
USPC ........................................................ 429/209
See application file for complete search history.

(56) References Cited

U.S. PATENT DOCUMENTS

| | | | |
|---|---|---|---|
| 7,976,973 B2 | 7/2011 | Nishiyama et al. |
| 8,460,812 B2 | 6/2013 | Takahata et al. |
| 9,257,717 B2 | 2/2016 | Muraoka et al. |

(Continued)

FOREIGN PATENT DOCUMENTS

| | | |
|---|---|---|
| CN | 101079500 A | 11/2007 |
| CN | 101150183 A | 3/2008 |

(Continued)

OTHER PUBLICATIONS

JP 2003045474 A mach. trans. (Year: 2003).*

(Continued)

*Primary Examiner* — Jonathan G Leong
*Assistant Examiner* — John S Medley
(74) *Attorney, Agent, or Firm* — Ladas & Parry LLP

(57) ABSTRACT

Embodiments of this application provide an electrode assembly, a manufacturing method and manufacturing system of same, a battery cell, and a battery. The electrode assembly includes a negative electrode plate and a positive electrode plate, where the negative electrode plate and the positive electrode plate are wound in a winding direction to form a winding structure, and the winding structure includes a bending zone. The negative electrode plate and the positive electrode plate each include a plurality of bending portions located in the bending zone.

18 Claims, 14 Drawing Sheets

(56) References Cited

U.S. PATENT DOCUMENTS

| | | | |
|---|---|---|---|
| 2004/0224219 A1* | 11/2004 | Miyaki | H01M 4/661 |
| | | | 429/231.95 |
| 2005/0058888 A1 | 3/2005 | Aamodt et al. | |
| 2008/0176140 A1 | 7/2008 | Nishiyama et al. | |
| 2011/0223456 A1 | 9/2011 | Sugaya et al. | |
| 2012/0258343 A1 | 10/2012 | Takahata et al. | |
| 2014/0065462 A1* | 3/2014 | Oh | H01M 50/451 |
| | | | 29/623.2 |
| 2014/0141305 A1 | 5/2014 | Muraoka et al. | |
| 2015/0340732 A1 | 11/2015 | Kim et al. | |
| 2019/0198935 A1 | 6/2019 | Sasaki et al. | |
| 2020/0083542 A1* | 3/2020 | Yushin | H01M 4/134 |
| 2021/0050586 A1* | 2/2021 | Nishino | H01M 10/0587 |

FOREIGN PATENT DOCUMENTS

| | | | | |
|---|---|---|---|---|
| CN | 101150185 | A | 3/2008 | |
| CN | 101253588 | A | 8/2008 | |
| CN | 102742065 | A | 10/2012 | |
| CN | 202495522 | U | 10/2012 | |
| CN | 103022408 | A | 4/2013 | |
| CN | 103563158 | A | 2/2014 | |
| CN | 205564871 | U | 9/2016 | |
| CN | 205828572 | U | 12/2016 | |
| CN | 207441856 | U | 6/2018 | |
| CN | 208045607 | U | 11/2018 | |
| CN | 208127332 | U | 11/2018 | |
| CN | 110970653 | A | 4/2020 | |
| CN | 111200109 | A | 5/2020 | |
| CN | 111370648 | A | 7/2020 | |
| CN | 213692108 | U | 7/2021 | |
| CN | 109524606 | B | 7/2022 | |
| JP | 2003045474 | A * | 2/2003 | Y02E 60/10 |
| JP | 2008004531 | A | 1/2008 | |
| JP | 4161400 | B2 | 10/2008 | |
| JP | 4658083 | B2 | 3/2011 | |
| JP | 2013020821 | A | 1/2013 | |
| JP | 2013073763 | A | 4/2013 | |
| JP | WO2011074098 | A1 | 4/2013 | |
| JP | 5472759 | B2 | 4/2014 | |
| JP | WO2013014827 | A1 | 2/2015 | |
| JP | 5884039 | B2 | 3/2016 | |
| KR | 20070113149 | A | 11/2007 | |
| KR | 101416767 | B1 | 7/2014 | |
| WO | 2007026492 | A1 | 3/2007 | |
| WO | 2019017257 | A1 | 1/2019 | |
| WO | WO-2019193870 | A1 * | 10/2019 | H01M 50/538 |
| WO | 2022036721 | A1 | 2/2022 | |

OTHER PUBLICATIONS

Barbosa et al., Recent Advances on Materials for Lithium-Ion Batteries, 2021, Energies, 14, p. 10 (Year: 2021).*

Notice of Reasons for Refusal, JP Application No. 2022-554387, dated Aug. 18, 2023.

Extended European Search Report for EP application No. 21904630.7, dated Sep. 6, 2023.

International Search Report for PCT Application No. PCT/CN2021/110976, mailed Oct. 18, 2021.

International Search Report of Application No. PCT/CN2021/075166, mailed Sep. 28, 2021.

Written Opinion of Application No. PCT/CN2021/075166, mailed Sep. 28, 2021.

* cited by examiner

ELECTRODE ASSEMBLY, MANUFACTURING METHOD AND MANUFACTURING SYSTEM OF SAME, BATTERY CELL, AND BATTERY

CROSS REFERENCE TO RELATED APPLICATION

This application is a continuation of International Patent Application No. PCT/CN2021/075166, filed on Feb. 4, 2021, which is incorporated herein by reference in its entirety.

TECHNICAL FIELD

This application relates to the technical field of batteries, and more specifically, to an electrode assembly, a manufacturing method and manufacturing system of same, a battery cell, and a battery.

BACKGROUND

Currently, batteries more commonly used in vehicles are generally lithium-ion batteries. As rechargeable batteries, lithium-ion batteries have advantages such as small size, high energy density, high power density, many cycles of use, and long storage time.

A rechargeable battery generally includes a housing and an electrode assembly. The housing is configured to accommodate the electrode assembly and an electrolyte. The electrode assembly typically includes a positive electrode plate and a negative electrode plate. Metal ions (such as lithium ions) migrate between the positive electrode plate and the negative electrode plate to generate electric energy.

For an ordinary electrode assembly, active substance is improperly distributed in electrode plates, which is less cost-efficient.

SUMMARY

This application provides an electrode assembly, a manufacturing method and manufacturing system of same, a battery cell, a battery, and an electric device, to resolve the problem of improper distribution of active substance in electrode plates.

According to a first aspect, an embodiment of this application provides an electrode assembly, including a negative electrode plate and a positive electrode plate, where the negative electrode plate and the positive electrode plate are wound in a winding direction to form a winding structure, and the winding structure includes a bending zone. The negative electrode plate and the positive electrode plate each include a plurality of bending portions located in the bending zone. At least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion.

In the foregoing solution, the active substance capacity per unit area in the outer part of the first bending portion in the negative electrode plate is greater than the active substance capacity per unit area in the inner part of the first bending portion, and therefore, it is less likely that there is an excess of active substance in the inner part of the first bending portion and insufficiency of active substance in the outer part of the first bending portion, making more proper distribution of active substance in at least a partial zone (zone in which the first bending portion is located) of the negative electrode plate. The active substance capacity per unit area in the outer part of the second bending portion is greater than the active substance capacity per unit area in the inner part of the second bending portion, and therefore, it is less likely that there is insufficiency of active substance in the outer part of the second bending portion and an excess of active substance in the inner part of the second bending portion, making more proper distribution of active substance in at least a partial zone (zone in which the second bending portion is located) of the positive electrode plate. With such structure, active substance is more properly distributed in at least partial zones of the electrode plates in the electrode assembly, which is more cost-efficient.

In some embodiments, at least one innermost bending portion in the negative electrode plate is the first bending portion, at least one innermost bending portion in the positive electrode plate is the second bending portion, and the second bending portion adjacent to the first bending portion is arranged outward from the first bending portion.

In the foregoing solution, when the active substance capacity per unit area in the inner part of the first bending portion and the active substance capacity per unit area in the outer part of the second bending portion satisfy design requirements, the active substance capacity per unit area in the outer part of the first bending portion is greater than the active substance capacity per unit area in the inner part of the first bending portion, and the active substance capacity per unit area in the outer part of the second bending portion is greater than an active substance capacity per unit area in an inner part of the second bending portion, thereby increasing a CB value of an outer part of the first bending portion, and reducing occurrence of lithium precipitation.

In some embodiments, at least one innermost bending portion in the negative electrode plate is the first bending portion. A bending portion in the positive electrode plate and adjacent to the first bending portion is a third bending portion. An active substance capacity per unit area in an outer part of the third bending portion is equal to an active substance capacity per unit area in an inner part of the third bending portion.

In the foregoing solution, the bending portion in the positive electrode plate and adjacent to the first bending portion is the third bending portion, and under the condition that the active substance capacity per unit area in the outer part of the first bending portion is greater than the active substance capacity per unit area in the inner part of the first bending portion, the active substance capacity per unit area in the outer part of the third bending portion can be equal to the active substance capacity per unit area in the inner part of the third bending portion, thereby simplifying a manufacturing process of the positive electrode plate.

In some embodiments, at least one innermost bending portion in the positive electrode plate is the second bending portion. A bending portion in the negative electrode plate and adjacent to the second bending portion is a fourth bending portion. An active substance capacity per unit area in an outer part of the fourth bending portion is equal to an active substance capacity per unit area in an inner part of the fourth bending portion.

Under the condition that the active substance capacity per unit area in the outer part of the second bending portion is greater than the active substance capacity per unit area in the inner part of the second bending portion, the active substance capacity per unit area in the outer part of the fourth bending portion can be equal to the active substance capacity per unit area in the inner part of the fourth bending portion, thereby simplifying a manufacturing process of the negative electrode plate.

In some embodiments, the first bending portion includes a first current collector portion, a first active substance portion, and a second active substance portion. The first current collector portion has a first inner surface and a first outer surface that are arranged opposite each other in a thickness direction of the first current collector portion, where the first active substance portion is provided on the first outer surface, and the second active substance portion is provided on the first inner surface.

In some embodiments, a thickness of the first active substance portion is greater than a thickness of the second active substance portion.

In the foregoing solution, the thickness of the first active substance portion is greater than the thickness of the second active substance portion, making an active substance capacity per unit area of the first active substance portion greater than an active substance capacity per unit area of the second active substance portion, so that the active substance capacity per unit area in the outer part of the first bending portion is greater than the active substance capacity per unit area in the inner part of the first bending portion.

In some embodiments, the first bending portion further includes a first conductive portion, the first conductive portion is connected between a second active substance portion and a first inner surface, and the thickness of the first active substance portion is greater than or equal to a total thickness of the second active substance portion and the first conductive portion.

In the foregoing solution, a first conductive portion is provided between the second active substance portion and the first current collector portion, making the thickness of the first active substance portion greater than or equal to the total thickness of the second active substance portion and the first conductive portion, so that the thickness of the first active substance portion is greater than the thickness of the second active substance portion.

In some embodiments, a gram capacity of an active material in the first active substance portion is greater than a gram capacity of an active material in the second active substance portion.

In the foregoing solution, the gram capacity of the active material in the first active substance portion is greater than the gram capacity of the active material in the second active substance portion, making an active substance capacity per unit area of the first active substance portion greater than an active substance capacity per unit area of the second active substance portion, so that the active substance capacity per unit area in the outer part of the first bending portion is greater than the active substance capacity per unit area in the inner part of the first bending portion.

In some embodiments, a mass ratio of the active material in the first active substance portion to the first active substance portion is greater than a mass ratio of the active material in the second active substance portion to the second active substance portion, so that the active substance capacity per unit area in the outer part of the first bending portion is greater than the active substance capacity per unit area in the inner part of the first bending portion.

In some embodiments, the first bending portion further includes a first conductive portion, the first conductive portion is connected between the first active substance portion and the first outer surface, and the first conductive portion includes an active material. A thickness of the second active substance portion is greater than or equal to a total thickness of the first active substance portion and the first conductive portion; and A gram capacity of the active material in the first active substance portion is less than a gram capacity of the active material in the first conductive portion, so that the active substance capacity per unit area in the outer part of the first bending portion is greater than the active substance capacity per unit area in the inner part of the first bending portion; or a mass ratio of the active material in the first active substance portion to the first active substance portion is less than a mass ratio of the active material in the first conductive portion to the first conductive portion, so that the active substance capacity per unit area in the outer part of the first bending portion is greater than the active substance capacity per unit area in the inner part of the first bending portion.

In some embodiments, the second bending portion includes a second current collector portion, a third active substance portion, and a fourth active substance portion. The second current collector portion has a second inner surface and a second outer surface that are arranged opposite each other in a thickness direction of the second current collector portion, where the third active substance portion is provided on the second outer surface, and the fourth active substance portion is provided on the second inner surface.

In some embodiments, a thickness of the third active substance portion is greater than a thickness of the fourth active substance portion.

In the foregoing solution, the thickness of the third active substance portion is greater than the thickness of the fourth active substance portion, making an active substance capacity per unit area of the third active substance portion greater than an active substance capacity per unit area of the fourth active substance portion, so that the active substance capacity per unit area in the outer part of the second bending portion is greater than the active substance capacity per unit area in the inner part of the second bending portion.

The second bending portion further includes a second conductive portion, the second conductive portion is connected between the fourth active substance portion and the second inner surface, and the thickness of the third active substance portion is greater than or equal to a total thickness of the fourth active substance portion and the second conductive portion. The second conductive portion is provided between the fourth active substance portion and a second current collector portion, making the thickness of the third active substance portion greater than or equal to the total thickness of the fourth active substance portion and the second conductive portion, so that the thickness of the third active substance portion is greater than the thickness of the fourth active substance portion.

In some embodiments, a gram capacity of an active material in the third active substance portion is greater than a gram capacity of an active material in the fourth active substance portion, making an active substance capacity per unit area of the third active substance portion greater than an active substance capacity per unit area of the fourth active substance portion, so that the active substance capacity per unit area in the outer part of the second bending portion is greater than the active substance capacity per unit area in the inner part of the second bending portion.

In some embodiments, a mass ratio of an active material in the third active substance portion to the third active substance portion is greater than a mass ratio of an active material in the fourth active substance portion to the fourth active substance portion, making an active substance capacity per unit area of the third active substance portion greater than an active substance capacity per unit area of the fourth active substance portion, so that the active substance capacity per unit area in the outer part of the second bending portion is greater than the active substance capacity per unit area in the inner part of the second bending portion.

In some embodiments, the negative electrode plate includes a negative electrode current collector, a first negative electrode active substance layer, and a second negative electrode active substance layer, where the first negative electrode active substance layer is located outward from the negative electrode current collector, and the second negative electrode active substance layer is located inward from the negative electrode current collector. The first negative electrode active substance layer includes a first portion and a second portion that are arranged along the winding direction, where the first portion extends from a start end of the first negative electrode active substance layer in the winding direction, the second portion is arranged with the first portion in succession in the winding direction, a thickness of the first portion is greater than a thickness of the second portion, and the thickness of the second portion is equal to a thickness of the second negative electrode active substance layer.

In the foregoing solution, the first active substance portion is a part of the first portion that is located at the first bending portion. The first negative electrode active substance layer is provided as the first portion and the second portion that have different thicknesses, so that the active substance capacity per unit area in the outer part of the first bending portion is greater than the active substance capacity per unit area in the inner part of the first bending portion.

In some embodiments, the first portion is wound at least one turn in the winding direction, so that at least one innermost bending portion in the negative electrode plate is the first bending portion.

In some embodiments, the positive electrode plate includes a positive electrode current collector, a first positive electrode active substance layer, and a second positive electrode active substance layer, where the first positive electrode active substance layer is located outward from the positive electrode current collector, and the second positive electrode active substance layer is located inward from the positive electrode current collector. The second positive electrode active substance layer includes a third portion and a fourth portion that are arranged along the winding direction, where the third portion extends from a start end of the second positive electrode active substance layer in the winding direction, the fourth portion is arranged with the third portion in succession in the winding direction, a thickness of the third portion is less than a thickness of the fourth portion, and the thickness of the fourth portion is equal to a thickness of the first positive electrode active substance layer.

In the foregoing solution, the fourth active substance portion is a part of the third portion that is located at the second bending portion. The second positive electrode active substance layer is provided as the third portion and the fourth portion that have different thicknesses, so that the active substance capacity per unit area in the outer part of the second bending portion is greater than the active substance capacity per unit area in the inner part of the second bending portion.

In some embodiments, a third portion is wound at least one turn in the winding direction, so that at least one innermost bending portion in the positive electrode plate is the second bending portion.

In some embodiments, a plurality of bending portions in the negative electrode plate that are sequentially arranged outward from an innermost part are first bending portions. A bending portion in the negative electrode plate and located outward from the plurality of first bending portions is a fourth bending portion, and an active substance capacity per unit area in an outer part of the fourth bending portion is equal to an active substance capacity per unit area in an inner part of the fourth bending portion. The active substance capacity per unit area in the outer part does not need to be increased for the fourth bending portion, thereby reducing an amount of active material used.

In some embodiments, a plurality of bending portions in the positive electrode plate that are sequentially arranged outward from an innermost part are second bending portions. A bending portion in the positive electrode plate and located outward from the plurality of first bending portions is a third bending portion, and an active substance capacity per unit area in an outer part of the third bending portion is equal to an active substance capacity per unit area in an inner part of the third bending portion. The active substance capacity per unit area of the third bending portion in the inner part does not need to be decreased, thereby ensuring a capacity of the electrode assembly.

According to a second aspect, an embodiment of this application provides a battery cell, including a housing and the electrode assembly according to any one of the embodiments of the first aspect. The electrode assembly is accommodated in the housing.

According to a third aspect, an embodiment of this application provides a battery, including a case and the battery cell according to any one of the embodiments of the second aspect. The battery cell is accommodated in the case.

According to a fourth aspect, an embodiment of this application provides an electric device, including the battery according to any one of the embodiments of the third aspect, where the battery is configured to supply electric energy.

According to a fifth aspect, an embodiment of this application provides a manufacturing method of an electrode assembly, including: providing a positive electrode plate; providing a negative electrode plate; and winding the negative electrode plate and the positive electrode plate in a winding direction to form a winding structure. The winding structure includes a bending zone, and the negative electrode plate and the positive electrode plate each include a plurality of bending portions located in the bending zone. At least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion.

In some embodiments, the steps of providing a negative electrode plate includes: providing a negative electrode current collector; applying a first negative electrode active substance layer on one surface of the negative electrode current collector; and applying a second negative electrode active substance layer on another surface of the negative electrode current collector. In the winding structure, the first negative electrode active substance layer is located outward from the negative electrode current collector, and the second negative electrode active substance layer is located inward from the negative electrode current collector; and the first negative electrode active substance layer includes a first portion and a second portion that are arranged along the winding direction, where the first portion extends from a start end of the first negative electrode active substance layer in the winding direction, the second portion is arranged with the first portion in succession in the winding direction, a thickness of the first portion is greater than a thickness of the second portion, and the thickness of the second portion is equal to a thickness of the second negative electrode active substance layer. At least a part of the first portion is located at the first bending portion.

In some embodiments, the steps of applying a first negative electrode active substance layer on one surface of the negative electrode current collector includes: applying a negative electrode active slurry on the one surface of the negative electrode current collector to form a first active coating; and applying the negative electrode active slurry on a partial zone of a surface of the first active coating facing away from the negative electrode current collector to form a second active coating, where the first active coating and the second active coating form the first negative electrode active substance layer after curing. A part of the first active coating coated with the second active coating and the second active coating form the first portion after curing, and a part of the first active coating uncoated with the second active coating forms the second portion after curing.

In some embodiments, the steps of providing a positive electrode plate includes: providing a positive electrode current collector; applying a first positive electrode active substance layer on one surface of the positive electrode current collector; and applying a second positive electrode active substance layer on another surface of the positive electrode current collector. In the winding structure, the first positive electrode active substance layer is located outward from the positive electrode current collector, and the second positive electrode active substance layer is located inward from the positive electrode current collector; and the second positive electrode active substance layer includes a third portion and a fourth portion that are arranged along the winding direction, where the third portion extends from a start end of the second positive electrode active substance layer in the winding direction, the fourth portion is arranged with the third portion in succession in the winding direction, a thickness of the third portion is less than a thickness of the fourth portion, and the thickness of the fourth portion is equal to a thickness of the first positive electrode active substance layer. At least a part of the third portion is located at the second bending portion.

In some embodiments, the steps of applying a second positive electrode active substance layer on another surface of the positive electrode current collector includes: applying a positive electrode active slurry on the another surface of the positive electrode current collector to form a third active coating; applying the positive electrode active slurry on a partial zone of a surface of the third active coating facing away from the positive electrode current collector to form a fourth active coating, where the third active coating and the fourth active coating form the second positive electrode active substance layer after curing. A part of the third active coating uncoated with the fourth active coating forms the third portion after curing, and a part of the third active coating coated with the fourth active coating and the fourth active coating form the fourth portion after curing.

According to a sixth aspect, an embodiment of this application provides a manufacturing system of an electrode assembly, including: a first providing apparatus, configured to provide a positive electrode plate; a second providing apparatus, configured to provide a negative electrode plate; and an assembling apparatus, configured to wind the negative electrode plate and the positive electrode plate in a winding direction to form a winding structure. The winding structure includes a bending zone, and the negative electrode plate and the positive electrode plate each include a plurality of bending portions located in the bending zone. At least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings based on the accompanying drawings without creative efforts.

Figure 1:
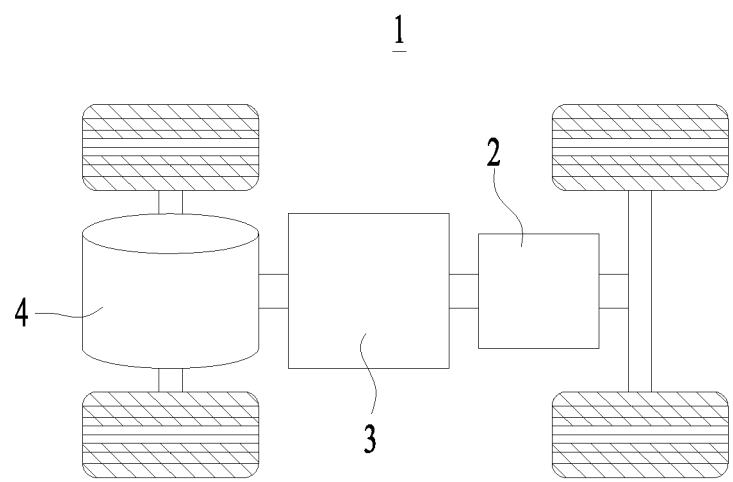
FIG. 1 is a schematic structural diagram of a vehicle according to some embodiments of this application.

The accompanying drawings are not drawn to scale.

DETAILED DESCRIPTION

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by a person skilled in the art to which this application pertains. In this application, the terms used in this specification of this application are only used to describe specific embodiments, and are not intended to limit this application. The terms "include", "comprise", or any variants thereof in the specification, claims, and description of drawings of this application are intended to cover a non-exclusive inclusion. In the specification, claims, or accompanying drawings of this application, the terms "first", "second", and so on are intended to distinguish between different objects but not to indicate a particular order or importance.

An "embodiment" mentioned in this application means that specified features, structures, or characteristics described with reference to this embodiment can be incorporated into at least one embodiment of this application. When used in various parts in this specification, this word neither necessarily refers to the same embodiment nor refers to an independent or alternate embodiment mutually exclusive with other embodiments.

In the descriptions of this application, it should be noted that unless otherwise specified and defined explicitly, the terms "install", "join", "connect", and "attach" should be understood in their general senses. For example, the terms may refer to a fixed connection, a detachable connection, or an integral connection, or may refer to a direct connection, an indirect connection through an intermediate medium, or an internal connection between two elements. A person of ordinary skill in the art can understand specific meanings of these terms in this application as appropriate to specific situations.

The term "and/or" in this application only describes an association for describing associated objects and represents that three relationships may exist. For example, A and/or B may represent the following three cases: only A, both A and B, and only B. In addition, the character "/" in this application generally indicates an "or" relationship between the associated objects.

In the embodiments of this application, the same reference signs denote the same components. For brevity, in different embodiments, detailed descriptions of the same components are omitted. It should be understood that dimensions such as thickness, length, and width of the various components in the embodiments of this application shown in the drawings, and dimensions such as total thickness, length, and width of an integral apparatus are only exemplary descriptions, which shall not constitute any limitation on this application.

In this application, "a plurality of" means more than two (inclusive).

In this application, a battery cell may include a lithium-ion secondary battery cell, a lithium-ion primary battery cell, a lithium-sulfur battery cell, a sodium lithium-ion battery cell, a sodium-ion battery cell, or a magnesium-ion battery cell, or the like. This is not limited in the embodiments of this application. The battery cell can be cylindrical, flat, or rectangular, or in other shapes. This is not limited in this embodiment of this application. By packaging methods, battery cells are generally classified into three types: cylindrical battery cell, square battery cell, and soft-packed battery cell. This is not limited in this embodiment of this application.

The battery mentioned in the embodiments of this application refers to a single physical module that includes one or more battery cells for providing a higher voltage and capacity. For example, the battery mentioned in this application may include a battery module, a battery pack, or the like. The battery typically includes a case for encapsulating one or more battery cells. The case can prevent a liquid or another foreign matter from affecting charging or discharging of the battery cell.

The battery cell includes an electrode assembly and an electrolyte. The electrode assembly includes a positive electrode plate, a negative electrode plate and a separator. Working of the battery cell mainly relies on migration of metal ions between the positive electrode plate and the negative electrode plate. The positive electrode plate includes a positive electrode current collector and a positive electrode active substance layer. The positive electrode active substance layer is applied on a surface of the positive electrode current collector. A positive electrode current collector uncoated with the positive electrode active substance layer bulges out of a positive electrode current collector coated with the positive electrode active substance layer, and the positive electrode current collector uncoated with the positive electrode active substance layer is used as a positive tab. Using a lithium-ion battery as an example, a material of the positive electrode current collector can be aluminum, and the positive electrode active substance can be lithium cobalt oxide, lithium iron phosphate, ternary lithium, lithium manganate oxide, or the like. The negative electrode plate includes a negative electrode current collector and a negative electrode active substance layer. The negative electrode active substance layer is applied on a surface of the negative electrode current collector. A negative electrode current collector uncoated with the negative electrode active substance layer bulges out of a negative electrode current collector coated with the negative electrode active substance layer, and the negative electrode current collector uncoated with the negative electrode active substance layer is used as a negative tab. A material of the negative electrode current collector can be copper, and the negative electrode active substance can be carbon, silicon, or the like. To ensure that a large current can pass without causing fusion, a plurality of positive tabs are provided and stacked together, and a plurality of negative tabs are provided and stacked together. A material of the separator can be polypropylene (PP) or polyethylene (PE), or the like. In addition, the electrode assembly may have a winding structure or a laminated structure. This embodiment of this application is not limited thereto.

For an ordinary electrode assembly, an active substance layer is improperly distributed in electrode plates, which is less cost-efficient.

The inventors have found that a thickness of an inner active substance layer of the negative electrode plate in the electrode assembly is the same as a thickness of an outer active substance layer of the negative electrode plate, and an active material of the inner active substance layer of the negative electrode plate is the same as that of the outer active substance layer; and a thickness of an inner active substance layer of the positive electrode plate is the same as a thickness of an outer active substance layer of the positive electrode plate, and an active material of the inner active substance layer of the positive electrode plate is the same as that of the outer active substance layer. In a bending zone of the electrode assembly, a radius of the inner active substance layer of the negative electrode plate is greater than a radius of the outer active substance layer of the positive electrode plate located inward from the negative electrode plate, and a radius of the outer active substance layer of the negative electrode plate is less than a radius of the inner active substance layer of the positive electrode plate located outward from the negative electrode plate. As a result, there is an excess of active substance in the inner part and insufficiency of active substance in the outer part of the bending portion of the negative electrode plate in the bending zone. Similarly, there can be insufficiency of active substance in the outer part and an excess of active substance in the inner part of the bending portion of the positive electrode plate in the bending zone. This situation is worse particularly where it is closer to a winding center. In an electrode assembly with such structure, active substance is improperly distributed in electrode plates, which is less cost-efficient.

In view of this, the embodiments of this application provide a technical solution, where the negative electrode plate and the positive electrode plate each include a plurality of bending portions located in the bending zone; and at least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion. With such structure, active substance is more properly distributed in at least partial zones of the electrode plates in the electrode assembly, which is more cost-efficient.

The technical solution described in the embodiments of this application is applicable to a battery and an electric device using the battery.

The electric device can be a vehicle, a mobile phone, a portable device, a notebook computer, a ship, a spacecraft, an electric toy, an electric tool, or the like. The vehicle can be a fossil fuel vehicle, a natural gas vehicle, or a new energy vehicle. The new energy vehicle can be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric vehicle toy, an electric ship toy, an electric airplane toy, and the like. The electric tool includes an electric metal cutting tool, an electric grinding tool, an electric assembly tool, an electric railway-specific tool, for example, an electric drill, an electric grinder, an electric wrench, an electric screwdriver, an electric hammer, an electric impact drill, a concrete vibrator, and an electric planer. The embodiments of this application impose no special limitation on the foregoing electric device.

For ease of description, an example in which the electric device is a vehicle is used for description in the following embodiments.

Referring to FIG. 1, FIG. 1 is a schematic structural diagram of a vehicle 1 according to some embodiments of this application. A battery 2 is provided inside the vehicle 1, and the battery 2 can be provided at a bottom, head, or tail part of the vehicle 1. The battery 2 can be configured to supply power to the vehicle 1. For example, the battery 2 can be used as an operational power supply for the vehicle 1.

The vehicle 1 may further include a controller 3 and a motor 4, and the controller 3 is configured to control the battery 2 to supply power to the motor 4, for example, to satisfy a working electricity need during start, navigation, and driving of the vehicle 1.

In some embodiments of this application, the battery 2 can be used as not only the operational power supply for the vehicle 1 but also a driving power supply for the vehicle 1, replacing all or a part of the fossil fuel or the natural gas to provide driving power for the vehicle 1.

Figure 2:
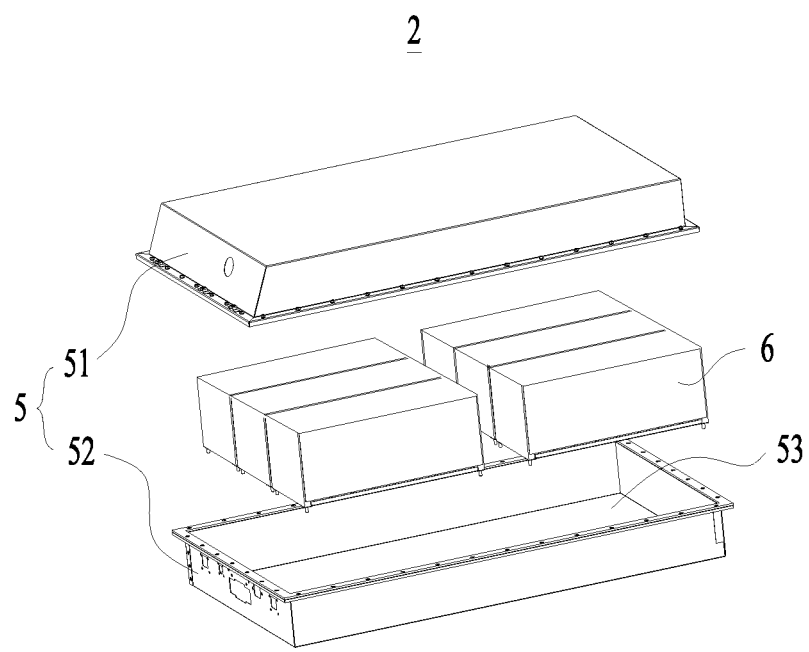
FIG. 2 is a schematic exploded view of a battery according to some embodiments of this application.

Referring to FIG. 2, FIG. 2 is a schematic exploded view of a battery 2 according to some embodiments of this application. The battery 2 includes a case 5 and a battery cell (not shown in FIG. 2), and the battery cell is accommodated in the case 5.

The case 5 is configured to accommodate the battery cell, and the case 5 may have various structures. In some embodiments, the case 5 may include a first case portion 51 and a second case portion 52, the first case portion 51 and the second case portion 52 mutually fit, and the first case portion 51 and the second case portion 52 jointly form an accommodating space 53 for accommodating the battery cell. The second case portion 52 may have a hollow structure with an opening at one side. The first case portion 51 has a plate-like structure. The first case portion 51 fits on the opening side of the second case portion 52 to form the case 5 with the accommodating space 53; or the first case portion 51 and the second case portion 52 may both have a hollow structure with an opening at one side, and the opening side of the first case portion 51 fits on the opening side of the second case portion 52, to form the case 5 with the accommodating space 53. Certainly, the first case portion 51 and the second case portion 52 may have various shapes, for example, being cylindrical or cuboid.

To improve sealing performance after the first case portion 51 and the second case portion 52 are connected, a sealing kit such as a sealing glue or a sealing ring may also be provided between the first case portion 51 and the second case portion 52.

Assuming that the first case portion 51 fits on a top of the second case portion 52, the first case portion 51 may also be referred to as an upper case cover, and the second case portion 52 may also be referred to as a lower case.

The battery 2 may include one or more battery cells. If a plurality of battery cells are provided, the plurality of battery cells can be connected in series or in parallel, or in a parallel-series connection. The parallel-series connection means that some of the plurality of battery cells are connected both in series and in parallel. The plurality of battery cells can be directly connected in series or in parallel, or in parallel-series connection, and then the entirety including the plurality of battery cells is accommodated in the case 5. Certainly, it is also possible that the plurality of battery cells are first connected in series or in parallel, or in parallel-series connection to form battery modules 6. Then the plurality of battery modules 6 are connected in series or in parallel, or in parallel-series connection to form an entirety that is accommodated in the case 5.

Figure 3:
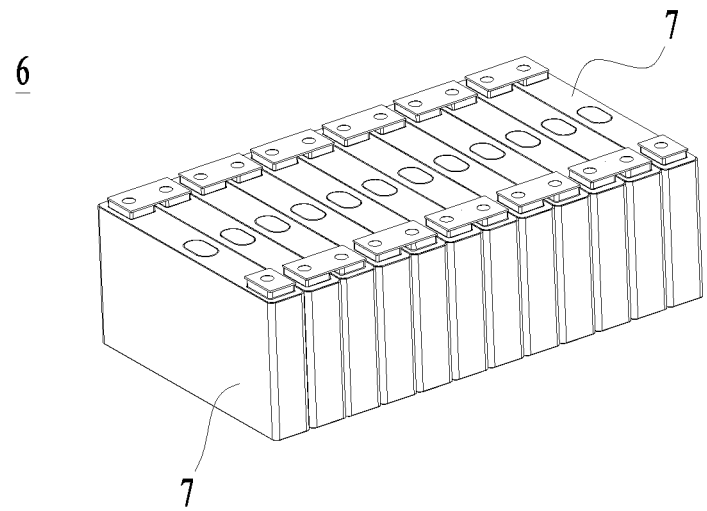
FIG. 3 is a schematic structural diagram of a battery module shown in FIG. 2.

In some embodiments, referring to FIG. 3, FIG. 3 is a schematic structural diagram of the battery module 6 shown in FIG. 2. A plurality of battery cells are provided, and the plurality of battery cells are first connected in series or in parallel, or in parallel-series connection to form the battery modules 6. The plurality of battery modules 6 are then connected in series or in parallel, or in parallel-series connection to form an entirety that is accommodated in the case.

The plurality of battery cells 7 in the battery module 6 can be electrically connected through a busbar, to implement the parallel, series, or parallel-series connection of the plurality of battery cells 7 in the battery module 6.

Figure 4:
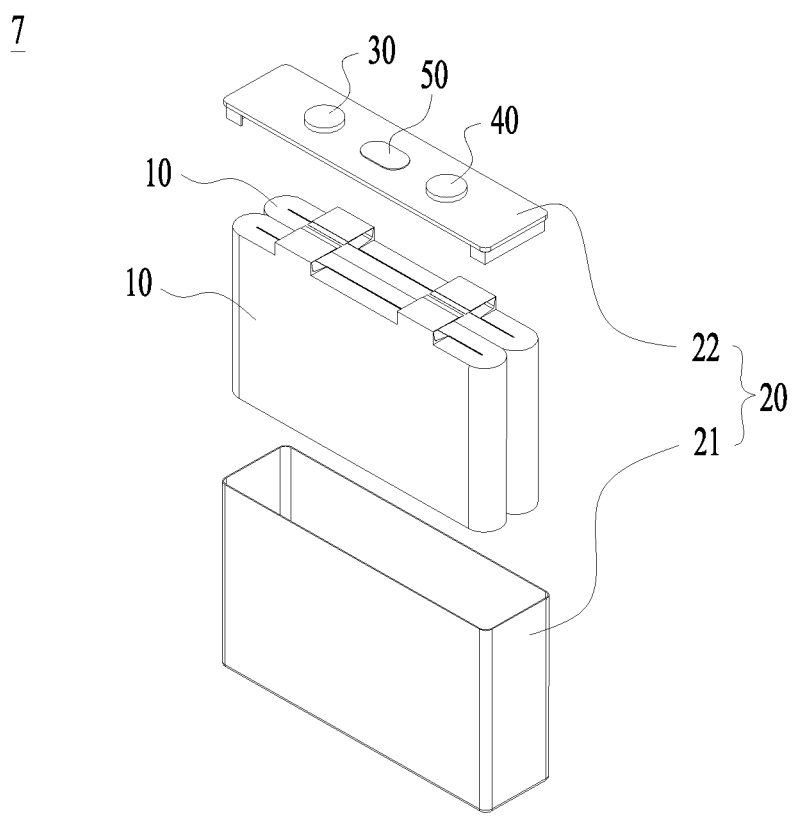
FIG. 4 is a schematic exploded view of a battery cell shown in FIG. 3.

Referring to FIG. 4, FIG. 4 is a schematic exploded view of the battery cell 7 shown in FIG. 3. The battery cell 7 provided in this embodiment of this application includes an electrode assembly 10 and a housing 20, and the electrode assembly 10 is accommodated in the housing 20.

In some embodiments, the housing 20 may also be configured to accommodate an electrolyte such as a liquid electrolyte. The housing 20 may have various structure forms.

In some embodiments, the housing 20 may include a shell 21 and an end cover 22. The shell 21 has a hollow structure with an opening at one side. The end cover 22 fits at an opening of the shell 21 and forms a sealed connection to form a sealed space configured to accommodate the electrode assembly 10 and the electrolyte.

When the battery cells 7 are assembled, the electrode assembly 10 may first be put into the shell 21, then the end cover 22 fits at the opening of the shell 21, and then the electrode is injected into the shell 21 through an electrolyte injection opening in the end cover 22.

The shell 21 may have various shapes, for example, being cylindrical or cuboid. The shape of the shell 21 can be determined based on a specific shape of the electrode assembly 10. For example, if the electrode assembly 10 has a cylindrical structure, a cylindrical shell can be selected; or if the electrode assembly 10 has a cuboid structure, a cuboid shell can be selected. Certainly, the end cover 22 may also have various structures. For example, the end cover 22 has a plate-like structure, a hollow structure with an opening on one side, or the like. For example, in FIG. 4, the shell 21 has a cuboid structure, the end cover 22 has a plate-like structure, and the end cover 22 fits at the opening at the top of the shell 21.

In some embodiments, the battery cell 7 may further include a positive electrode terminal 30, a negative electrode terminal 40, and a pressure relief mechanism 50, and the positive electrode terminal 30, the negative electrode terminal 40, and the pressure relief mechanism 50 are all mounted to the end cover 22. Both the positive electrode terminal 30 and the negative electrode terminal 40 are configured to electrically connect the electrode assembly 10 to output electric energy generated by the electrode assembly 10. The pressure relief mechanism 50 is configured to relieve internal pressure of the battery cell 7 when the internal pressure or temperature of the battery cell 7 reaches a predetermined value.

For example, the pressure relief mechanism 50 is located between the positive electrode terminal 30 and the negative electrode terminal 40, and the pressure relief mechanism 50 can be a component such as an explosion-proof valve, a rupture disk, an air valve, a pressure relief valve, or a safety valve.

Certainly, in some embodiments, the housing 20 may have another structure. For example, the housing 20 includes a shell 21 and two end covers 22. The shell 21 has a hollow structure with two opposite openings. One end cover 22 correspondingly fits at one opening of the shell 21 and forms a sealed connection to form a sealed space configured to accommodate the electrode assembly 10 and the electrolyte. In the structure, the positive electrode terminal 30 and the negative electrode terminal 40 can be mounted on a same end cover 22 or different end covers 22. The pressure relief mechanism 50 can be mounted to one end cover 22, or the pressure relief mechanism 50 can be mounted to both end covers 22.

It should be noted that in the battery cell 7, one or more electrode assemblies 10 can be accommodated in the housing 20. For example, in FIG. 4, two electrode assemblies 10 are provided.

Next, a specific structure of the electrode assembly 10 is described in detail with reference to the accompanying drawings.

Figure 5:
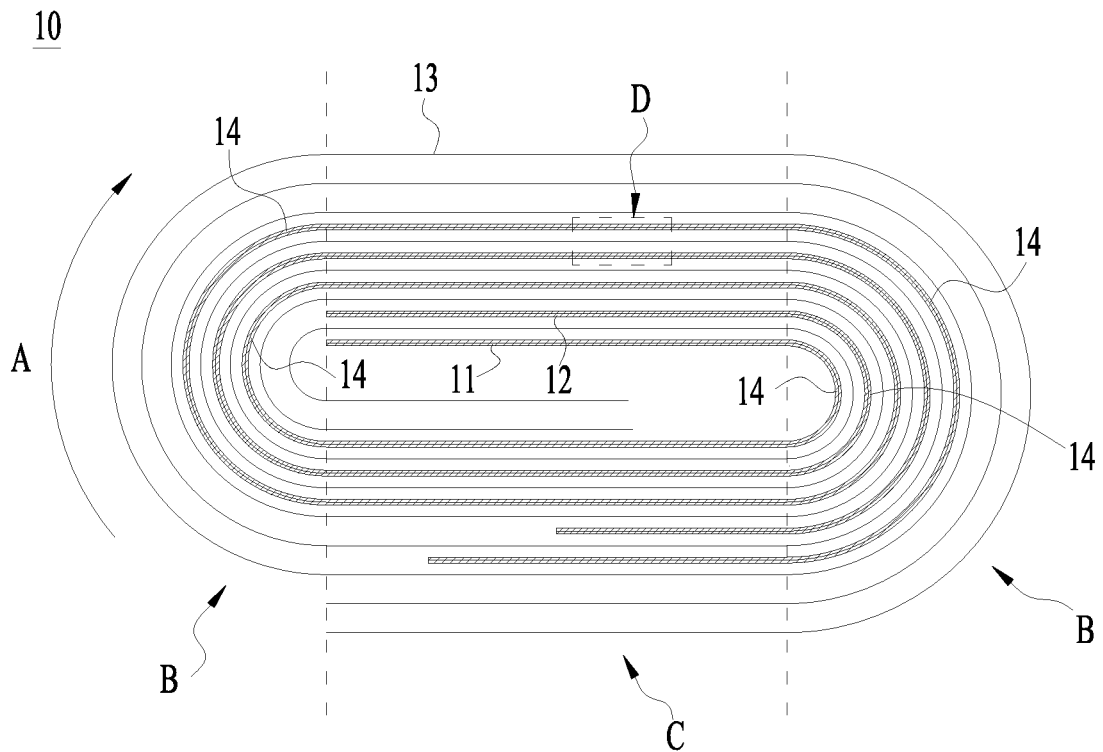
FIG. 5 is a schematic structural diagram of an electrode assembly according to some embodiments of this application.

Referring to FIG. 5, FIG. 5 is a schematic structural diagram of an electrode assembly 10 according to some embodiments of this application. The electrode assembly 10 in this embodiment of this application includes a negative electrode plate 11 and a positive electrode plate 12. The negative electrode plate 11 and the positive electrode plate 12 are wound in a winding direction A to form a winding structure, and the winding structure includes a bending zone B. The negative electrode plate 11 and the positive electrode plate 12 each include a plurality of bending portions 14 located in the bending zone B.

At least one innermost bending portion 14 in the negative electrode plate 11 is a first bending portion, and an active substance capacity per unit area in an outer part of the first bending portion is greater than an active substance capacity per unit area in an inner part of the first bending portion; and/or at least one innermost bending portion 14 in the positive electrode plate 12 is a second bending portion, and an active substance capacity per unit area in an outer part of the second bending portion is greater than an active substance capacity per unit area in an inner part of the second bending portion.

Under the condition that the active substance capacity per unit area in the outer part of the first bending portion in the negative electrode plate 11 is greater than the active substance capacity per unit area in the inner part of the first bending portion, it is less likely that there is an excess of active substance in the inner part of the first bending portion and insufficiency of active substance in the outer part of the first bending portion, making more proper distribution of active substance in at least a partial zone (zone in which the first bending portion is located) of the negative electrode plate. Under the condition that the active substance capacity per unit area in the outer part of the second bending portion in the positive electrode plate 12 is greater than the active substance capacity per unit area in the inner part of the second bending portion, it is less likely that there is insufficiency of active substance in the outer part of the second bending portion and an excess of active substance in the inner part of the second bending portion, making more proper distribution of active substance in at least a partial zone (zone in which the second bending portion is located) of the positive electrode plate 12. With such structure, active substance is more properly distributed in at least partial zones of the electrode plates in the electrode assembly 10, which is more cost-efficient.

In addition, when the active substance capacity per unit area in the inner part of the first bending portion satisfies a design requirement, that is, when the active substance capacity per unit area in the inner part of the first bending portion reaches the first preset value, lithium precipitation is less likely to occur to the active substance in the inner part of the first bending portion. Because the active substance capacity per unit area in the outer part of the first bending portion is greater than the active substance capacity per unit area in the inner part of the first bending portion, which is equivalent to increasing the active substance capacity per unit area in the outer part of the first bending portion in respect of the first preset value, thereby increasing a CB value of active substance in the outer part of the first bending portion, so that lithium precipitation is less likely to occur to the active substance in the outer part of the first bending portion. Likewise, when the active substance capacity per unit area in the outer part of the second bending portion satisfies a design requirement, that is, when the active substance capacity per unit area in the outer part of the second bending portion reaches a second preset value, lithium precipitation is less likely to occur to the active substance in the inner part of the bending portion 14 that is in the negative electrode plate 11 and outward from the second bending portion. Because the active substance capacity per unit area in the outer part of the second bending portion is greater than the active substance capacity per unit area in the inner part of the second bending portion, which is equivalent to decreasing the active substance capacity per unit area in the inner part of the second bending portion in respect of the second preset value, lithium precipitation is also less likely to occur to the active substance in the outer part of the bending portion 14 that is in the negative electrode plate 11 and outward from the second bending portion.

The cell balance (CB) value is a ratio of a negative electrode active substance capacity per unit area to a positive electrode active substance capacity per unit area. For example, a cell balance (CB) value of active substance in the outer part of the bending portion 14 of the negative electrode plate 11 is Q1/Q2, where an active substance capacity per unit area of active substance in an outer part of one bending portion 14 of the negative electrode plate 11 is Q1, and an active substance capacity per unit area of active substance in an inner part of a bending portion 14 that is in the positive electrode plate 12 and located outward from and adjacent to the one bending portion 14 is Q2.

The inventors have also found that when the positive electrode plate 12 and the negative electrode plate 11 are wound, the positive electrode plate 12 and the negative electrode plate 11 are bent in the bending zone B, and therefore, corresponding active substances can be detached, which is referred to as a dusting phenomenon. In particular, bending degrees of an innermost bending portion 14 in the negative electrode plate 11 and an innermost bending portion 14 in the positive electrode plate 12 are maximum, and as a result, the active substance is more likely to detach. Due to the detachment of active substance, especially detachment of active substance from the negative electrode plate 11, a quantity of lithium intercalation sites of active substance of the negative electrode plate 11 can be less than a quantity of lithium ions that can be provided by active substance of the adjacent negative electrode plate 12. As a result, a lithium-ion battery is prone to lithium precipitation during charging.

In this application, the active substance capacity per unit area in the outer part of the first bending portion is greater than the active substance capacity per unit area in the inner part of the first bending portion, which is equivalent to increasing the active substance capacity per unit area in the outer part of the first bending portion, that is, increasing the CB value of the active substance in the outer part of the first bending portion. As such, even if there is active substance falling off the outer part of the first bending portion in a bending process, a CB value requirement for the active substance in the outer part of the first bending portion can still be satisfied, thereby reducing a risk of lithium precipitation. Likewise, because the active substance capacity per unit area in the outer part of the second bending portion is greater than the active substance capacity per unit area in the inner part of the second bending portion, which is equivalent to decreasing the active substance capacity per unit area in the inner part of the second bending portion, even if there is active substance falling off the inner part of a bending portion 14 that is in the negative electrode plate 11 and inward from the second bending portion, a risk of lithium precipitation can be reduced for the active substance in the outer part of the bending portion 14 that is in the negative electrode plate 11 and inward from the second bending portion.

In this embodiment of this application, the winding direction A is a direction in which the positive electrode plate 12 and the negative electrode plate 11 are wound radially outward. In FIG. 5, the winding direction A is a clockwise direction.

In some embodiments, the electrode assembly 10 may further include a separator 13. The separator 13 is configured to separate the positive electrode plate 12 and the negative electrode plate 11, to reduce a risk of a short circuit between the positive electrode plate 12 and the negative electrode plate 11. The separator 13 has a large quantity of penetrating micropores, and therefore, can ensure free passage of electrolyte ions and has good permeability performance for lithium ions. Therefore, the separator 13 is substantially unable to block passage of lithium ions.

A material of the separator 13 can be polypropylene (PP) or polyethylene (PE), or the like.

In some embodiments, the winding structure further includes a straight flat zone C, and the straight flat zone C is connected to the bending zone B. It is possible that two opposite ends of the straight flat zone C are both provided with bending zones B. The straight flat zone C is a zone with a straight flat structure in the winding structure, and a part of the positive electrode plate 12 located in the straight flat zone C and a part of the negative electrode plate 11 located in the straight flat zone C are arranged substantially straight and flat. The bending zone B is a zone with a bending structure in the winding structure, and a part of the positive electrode plate 12 located in the bending zone B (bending portion 14) and a part of the negative electrode plate 11 located in the bending zone B (bending portion 14) are both bent. For example, the bending portion 14 of the positive electrode plate 12 and the bending portion 14 of the negative electrode plate 11 are both arc-shaped.

It should be noted that, under the condition that the first bending portion is provided in the bending zone B, the first bending portion can be provided in only one bending zone B, or first bending portions can be provided in two bending zones B; or under the condition that the second bending portion is provided in the bending zone B, the second bending portion can be provided in only one bending zone B, or second bending portions can be provided in two bending zones B.

For example, as shown in FIG. 5, in the bending zone B, a plurality of bending portions 14 in the positive electrode plate 12 and a plurality of bending portions 14 in the negative electrode plate 11 are arranged alternately. That is, in the bending zone B, one bending portion 14 of the negative electrode plate 11, one bending portion 14 of the positive electrode plate 12, one bending portion 14 of the negative electrode plate 11, and so on are arranged sequentially. In some embodiments, the innermost bending portion 14 of the positive electrode plate 12 is located outward from the innermost bending portion 14 of the negative electrode plate 11.

Figure 6:
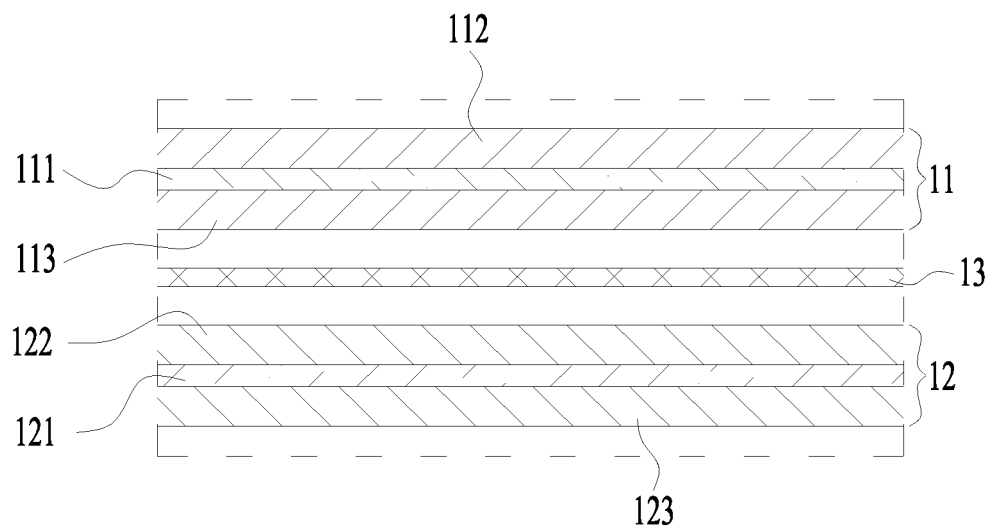
FIG. 6 is an enlarged schematic diagram of the electrode assembly shown in FIG. 5 at block D.

In some embodiments, referring to FIG. 6, FIG. 6 is an enlarged schematic diagram of the electrode assembly 10 shown in FIG. 5 at block D. The negative electrode plate 11 includes a negative electrode current collector 111 and negative electrode active substance layers that are provided on two sides in a thickness direction of the negative electrode current collector 111. The negative electrode active substance layers on the two sides in the thickness direction of the negative electrode current collector 111 are respectively referred to as the first negative electrode active substance layer 112 and the second negative electrode active substance layer 113. In the winding structure, the first negative electrode active substance layer 112 is located outward from the negative electrode current collector 111, and the second negative electrode active substance layer 113 is located inward from the negative electrode current collector 111. In some instances, the first negative electrode active substance layer 112 is applied on an outer surface of the negative electrode current collector 111, and the second negative electrode active substance layer 113 is applied on an inner surface of the negative electrode current collector 111.

The positive electrode plate 12 includes a positive electrode current collector 121 and positive electrode active substance layers provided on two sides in a thickness direction of the positive electrode current collector 121. The positive electrode active substance layers on the two sides in the thickness direction of the positive electrode current collector 121 are respectively referred to as the first positive electrode active substance layer 122 and the second positive electrode active substance layer 123. In the winding structure, the first positive electrode active substance layer 122 is located outward from the positive electrode current collector 121, and the second positive electrode active substance layer 123 is located inward from the positive electrode current collector 121. In some instances, the first positive electrode active substance layer 122 is applied on an outer surface of the positive electrode current collector 121, and the second positive electrode active substance layer 123 is applied on an inner surface of the positive electrode current collector 121.

The negative electrode current collector 111 may have a part coated with no negative electrode active substance layer, and that part is a negative tab (not shown in the figures); and the positive electrode current collector 121 may have a part coated with no positive electrode active substance layer, that the part is a positive tab (not shown in the figures). The positive tab is configured to electrically connect the positive electrode terminal 30 (see FIG. 4), and the negative tab is configured to electrically connect the negative electrode terminal 40 (see FIG. 4).

Figure 7:
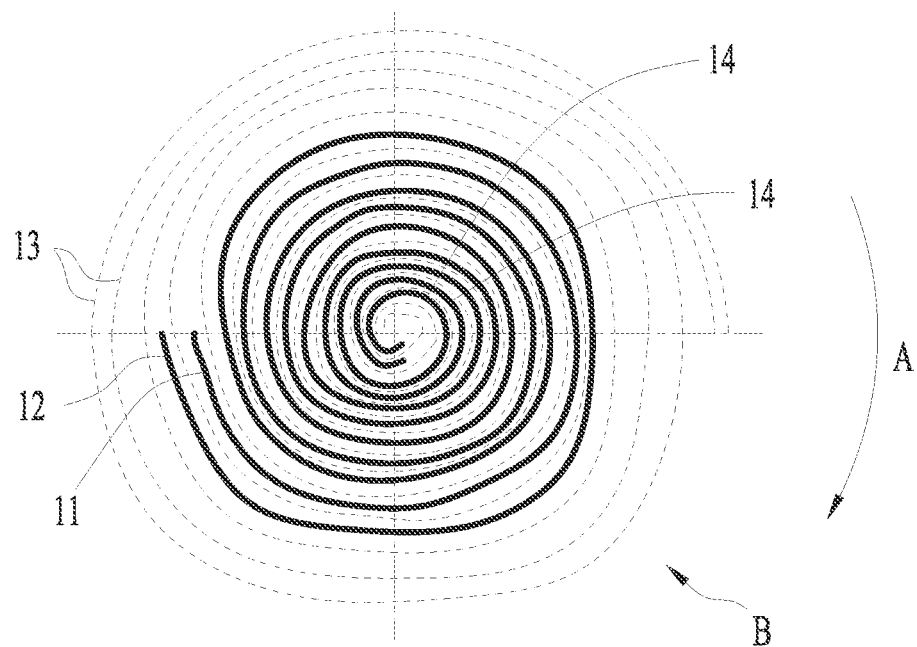
FIG. 7 is a schematic structural diagram of an electrode assembly according to some other embodiments of this application.

In another embodiment, referring to FIG. 7, FIG. 7 is a schematic structural diagram of an electrode assembly according to some other embodiments of this application. The winding structure may only have the bending zone B and no straight flat zone C, and the entire electrode assembly 22 with the structure can be a cylinder. One turn of electrode plate in the positive electrode plate 11 is a bending portion 14; and one turn of electrode plate in the negative electrode plate 12 is a bending portion 14.

Figure 8:
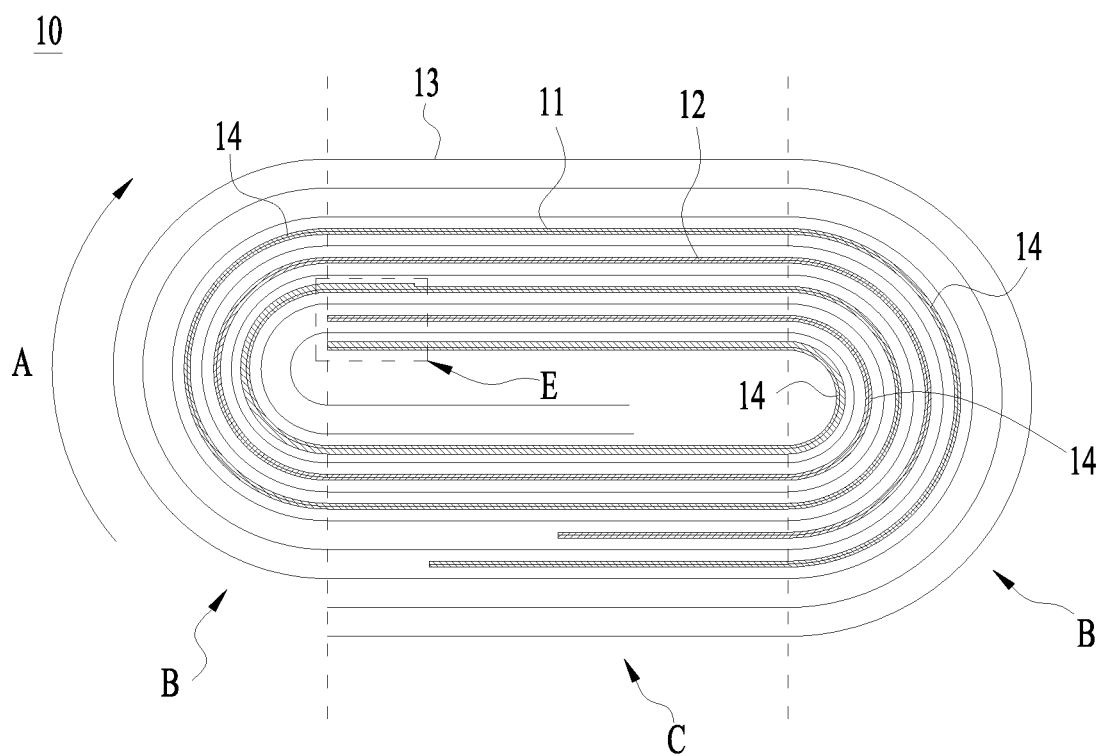
FIG. 8 is a schematic structural diagram of an electrode assembly according to still other embodiments of this application.
Figure 9:
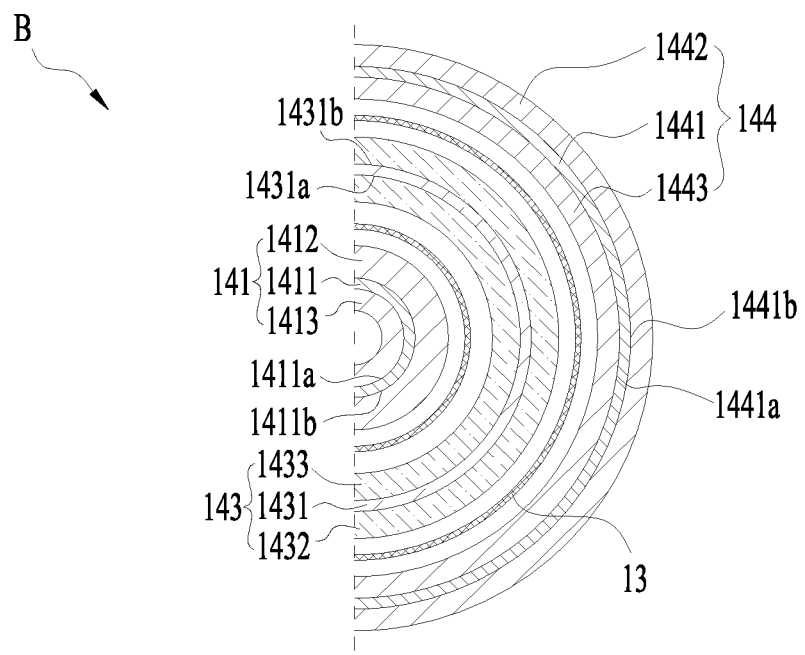
FIG. 9 is a locally enlarged schematic diagram of a bending zone of the electrode assembly shown in FIG. 8.
Figure 10:
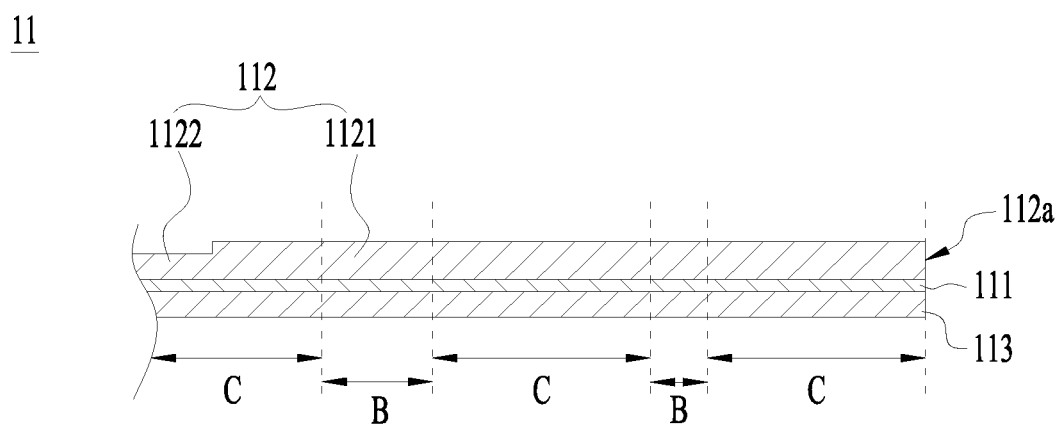
FIG. 10 is a local schematic diagram of the negative electrode plate shown in FIG. 8 in an unfolded state.
Figure 11:
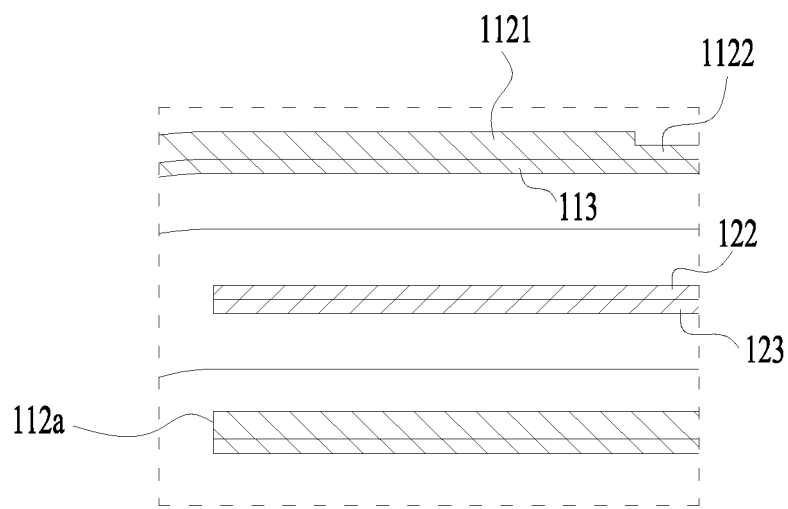
FIG. 11 is an enlarged schematic diagram of the electrode assembly shown in FIG. 8 at block E.

FIG. 8 is a schematic structural diagram of an electrode assembly 10 according to still other embodiments of this application. FIG. 9 is a locally enlarged schematic diagram of a bending zone B of the electrode assembly 10 shown in FIG. 8. FIG. 10 is a local schematic diagram of the negative electrode plate 11 shown in FIG. 8 in an unfolded state. FIG. 11 is an enlarged schematic diagram of the electrode assembly 10 shown in FIG. 8 at block E.

In some embodiments, as shown in FIG. 8 to FIG. 11, at least one innermost bending portion 14 in the negative electrode plate 11 is a first bending portion 141, and an active substance capacity per unit area in an outer part of the first bending portion 141 is greater than an active substance capacity per unit area in an inner part of the first bending portion 141. A bending portion 14 adjacent to the first bending portion 141 in the positive electrode plate 12 is a third bending portion 143, an active substance capacity per unit area in an outer part of the third bending portion 143 is equal to an active substance capacity per unit area in an inner part of the third bending portion 143.

Under the condition that the active substance capacity per unit area in the outer part of the first bending portion 141 is greater than an active substance capacity per unit area in an inner part of the first bending portion 141, the active substance capacity per unit area in the outer part of the third bending portion 143 can be equal to the active substance capacity per unit area in the inner part of the third bending portion 143, thereby simplifying a manufacturing process of the positive electrode plate 12.

The first bending portion 141 includes a first current collector portion 1411, a first active substance portion 1412, and a second active substance portion 1413. The first active substance portion 1412 and the second active substance portion 1413 are respectively located on two sides of the first current collector portion 1411. In some instances, the first current collector portion 1411 has a first inner surface 1411a and a first outer surface 1411b that are arranged opposite each other in a thickness direction of the first current collector portion, where the first active substance portion 1412 is provided on the first outer surface 1411b, and the second active substance portion 1413 is provided on the first inner surface 1411a. The third bending portion 143 includes a third current collector portion 1431, a fifth active substance portion 1432, and a sixth active substance portion 1433. The third current collector portion 1431 has a third inner surface 1431a and a third outer surface 1431b that are arranged opposite each other in a thickness direction of the third current collector portion, where the fifth active substance portion 1432 is provided on the third outer surface 1431b, and the sixth active substance portion 1433 is provided on the third inner surface 1431a.

It can be understood that the first current collector portion 1411 is a part of the negative electrode current collector 111 (see FIG. 6) in the first bending portion 141, the first active substance portion 1412 is a part of the first negative electrode active substance layer 112 (see FIG. 6) in the first bending portion 141, and the second active substance portion 1413 is a part of the second negative electrode active substance layer 113 (see FIG. 6) in the first bending portion 141. The third current collector portion 1431 is a part of the positive electrode current collector 121 (see FIG. 6) in the third bending portion 143, the fifth active substance portion 1432 is a part of the first positive electrode active substance layer 122 (see FIG. 6) in the third bending portion 143, and the sixth active substance portion 1433 is a part of the second positive electrode active substance layer 123 (see FIG. 6) in the third bending portion 143.

That the active substance capacity per unit area in the outer part of the first bending portion 141 is greater than the active substance capacity per unit area in the inner part of the first bending portion 141, means that an active substance capacity per unit area of the first active substance portion 1412 (outer part of the first bending portion 141) is greater than an active substance capacity per unit area of the second active substance portion 1413 (inner part of the first bending portion 141). The active substance capacity per unit area in the outer part of the first bending portion 141 is a ratio of an active substance capacity of the first active substance portion 1412 to an area of the first outer surface 1411b, and the active substance capacity per unit area in the inner part of the first bending portion 141 is a ratio of an active substance capacity of the second active substance portion 1413 to an area of the first inner surface 1411a.

That the active substance capacity per unit area in the outer part of the third bending portion 143 is equal to the active substance capacity per unit area in the inner part of the third bending portion 143, means that an active substance capacity per unit area of the fifth active substance portion 1432 (outer part of the third bending portion 143) is equal to an active substance capacity per unit area of the sixth active substance portion 1433 (inner part of the third bending portion 143). The active substance capacity per unit area in the outer part of the third bending portion 143 is a ratio of an active substance capacity of the fifth active substance portion 1432 to an area of the third outer surface 1431b, and the active substance capacity per unit area in the inner part of the third bending portion 143 is a ratio of an active substance capacity of the sixth active substance portion 1433 to an area of the third inner surface 1431a.

In the negative electrode plate 11, all the bending portions 14 can be first bending portions 141, or some bending portions 14 can be the first bending portions 141. If all the bending portions 14 in the negative electrode plate 11 are the first bending portions 141, for all the bending portions 14 in the negative electrode plate 11, an active substance capacity per unit area in an outer part is greater than an active substance capacity per unit area in an inner part. If only some bending portions 14 in the negative electrode plate 11 are the first bending portions 141, a structure in which an active substance capacity per unit area in an outer part is equal to an active substance capacity per unit area in an inner part can be used for bending portion(s) 14 in the negative electrode plate 11 other than the first bending portions 141. In the positive electrode plate 12, all the bending portions 14 can be third bending portions 143, or only some bending portions 14 can be the third bending portions 143.

In some embodiments, all the bending portions 14 in the positive electrode plate 12 are the third bending portions 143, thereby simplifying a manufacturing process of the positive electrode plate 12.

For a plurality of bending portions 14 of the negative electrode plate 11, in the direction from inside to outside, the radius is ascending and falling of coating off the plurality of bending portions 14 during bending is descending. Therefore, a structure in which an active substance capacity per unit area in an outer part is equal to an active substance capacity per unit area in an inner part can be used for some bending portions 14 of the negative electrode plate 11 that are close to the outer side. In some embodiments, at least one innermost bending portion 14 in the negative electrode plate 11 is the first bending portion 141, at least one outermost bending portion 14 in the negative electrode plate 11 is a fourth bending portion 144, and an active substance capacity per unit area in an outer part of the fourth bending portion 144 is equal to an active substance capacity per unit area in an inner part of the fourth bending portion 144. In some embodiments, the active substance capacity per unit area in the inner part of the fourth bending portion 144 is equal to the active substance capacity per unit area in the inner part of the first bending portion 141.

The fourth bending portion 144 includes a fourth current collector portion 1441, a seventh active substance portion 1442, and an eighth active substance portion 1443. The fourth current collector portion 1441 has a fourth inner surface 1441a and a fourth outer surface 1441b that are arranged opposite each other in a thickness direction of the fourth current collector portion, the seventh active substance portion 1442 is provided on the fourth outer surface 1441b, and the eighth active substance portion 1443 is provided on the fourth inner surface 1441a. It can be understood that the fourth current collector portion 1441 is a part of the negative electrode current collector 111 (see FIG. 6) in the fourth bending portion 144, the seventh active substance portion 1442 is a part of the first negative electrode active substance layer 112 (see FIG. 6) in the fourth bending portion 144, and the eighth active substance portion 1443 is a part of the second negative electrode active substance layer 113 (see FIG. 6) in the fourth bending portion 144.

That the active substance capacity per unit area in the outer part of the fourth bending portion 144 is equal to the active substance capacity per unit area in the inner part of the fourth bending portion 144, means that an active substance capacity per unit area of the seventh active substance portion 1442 (outer part of the fourth bending portion 144) is equal to an active substance capacity per unit area of the eighth active substance portion 1443 (inner part of the fourth bending portion 144). The active substance capacity per unit area in the outer part of the fourth bending portion 144 is a ratio of an active substance capacity of the seventh active substance portion 1442 to an area of the fourth outer surface 1441b, and the active substance capacity per unit area in the inner part of the fourth bending portion 144 is a ratio of an active substance capacity of the eighth active substance portion 1443 to an area of the fourth inner surface 1441a.

In some embodiments, a plurality of bending portions 14 in the negative electrode plate that are sequentially arranged outward from an innermost part 11 are first bending portions 141. A bending portion 14 that is in the negative electrode plate 11 and that is located outward from the plurality of first bending portions 141 is a fourth bending portion 144. A quantity of bending portions 14 in the negative electrode plate 11 is equal to a sum of a quantity of first bending portions 141 and a quantity of fourth bending portions 144. In some instances, in each bending zone B, a quantity of first bending portions 141 is two. The active substance capacity per unit area in the outer part does not need to be increased for the fourth bending portion 144, thereby reducing an amount of active material used.

In this embodiment of this application, there can be a plurality of manners to ensure that the active substance capacity per unit area in the outer part of the first bending portion 141 is greater than the active substance capacity per unit area in the inner part of the first bending portion 141.

In some embodiments, a thickness of the first active substance portion 1412 is greater than a thickness of the second active substance portion 1413, so that the active substance capacity per unit area in the outer part of the first bending portion 141 is greater than the active substance capacity per unit area in the inner part of the first bending portion 141. In some embodiments, except for the thickness, the first active substance portion 1412 is the same as the second active substance portion 1413. For example, an active material of the first active substance portion 1412 is the same as an active material of the second active substance portion 1413, and a mass ratio of the active material of the first active substance portion 1412 to the first active substance portion 1412 is greater than a mass ratio of the active material in the second active substance portion 1413 to the second active substance portion 1413.

Under the condition that other parameters (such as type of active material and mass ratio of active material) are the same, the thickness of the first active substance portion 1412 being greater than the thickness of the second active substance portion 1413 may make an active substance capacity per unit area of the first active substance portion 1412 greater than an active substance capacity per unit area of the second active substance portion 1413, so that the active substance capacity per unit area in the outer part of the first bending portion 141 is greater than the active substance capacity per unit area in the inner part of the first bending portion 141.

The active material of the first active substance portion 1412 and the active material of the second active substance portion 1413 may both be graphite or silicon compounds. The second active substance portion 1413 and the first active substance portion 1412 are formed by curing an active slurry with same composition.

Optionally, a thickness of the first active substance portion 1412 is greater than a thickness of the second active substance portion 1413 by 0.5% to 20%.

For example, a thickness of the first active substance portion 1412 is greater than a thickness of the second active substance portion 1413 by 1.5% to 12%.

In some embodiments, the first negative electrode active substance layer 112 includes a first portion 1121 and a second portion 1122 that are arranged along the winding direction A, where the first portion 1121 extends from a start end 112a of the first negative electrode active substance layer 112 in the winding direction A, and the second portion 1122 is arranged with the first portion 1121 in succession in the winding direction A, and a thickness of the first portion 1121 is greater than a thickness of the second portion 1122. The start end 112a of the first negative electrode active substance layer 112 is an inner end of the first negative electrode active substance layer 112 in the winding direction A. In some instances, the thickness of the second portion 1122 is equal to a thickness of the second negative electrode active substance layer 113.

In some embodiments, the first active substance portion 1412 is a part of the first portion 1121 located at the first bending portion 141, and the seventh active substance portion 1442 is a part of the second portion 1122 that is located at the fourth bending portion 144. The first negative electrode active substance layer 112 is provided as the first portion 1121 and the second portion 1122 with different thicknesses, so that the active substance capacity per unit area in the outer part of the first bending portion 141 is greater than the active substance capacity per unit area in the inner part of the first bending portion 141 and the active substance capacity per unit area in the outer part of the fourth bending portion 144 is equal to the active substance capacity per unit area in the inner part of the fourth bending portion 144.

In some embodiments, the first portion 1121 is wound at least one turn in the winding direction A. That is, the first negative electrode active substance layer 112 is wound a plurality of turns in the winding direction A, and at least the first turn of the first negative electrode active substance layer 112 is the first portion 1121. A start point of the first turn is the start end 112a of the first negative electrode active substance layer 112, an end point of the first turn is located outward from the start end 112a of the first negative electrode active substance layer 112, and the start point and the end point of the first turn are flush in a thickness direction of the first negative electrode active substance layer 112. In this embodiment of this application, the first portion 1121 is wound at least one turn in the winding direction A, so that at least one innermost bending portion 14 in the negative electrode plate 11 is the first bending portion 141. Optionally, the first portion 1121 is wound two turns in the winding direction A.

Figure 12:
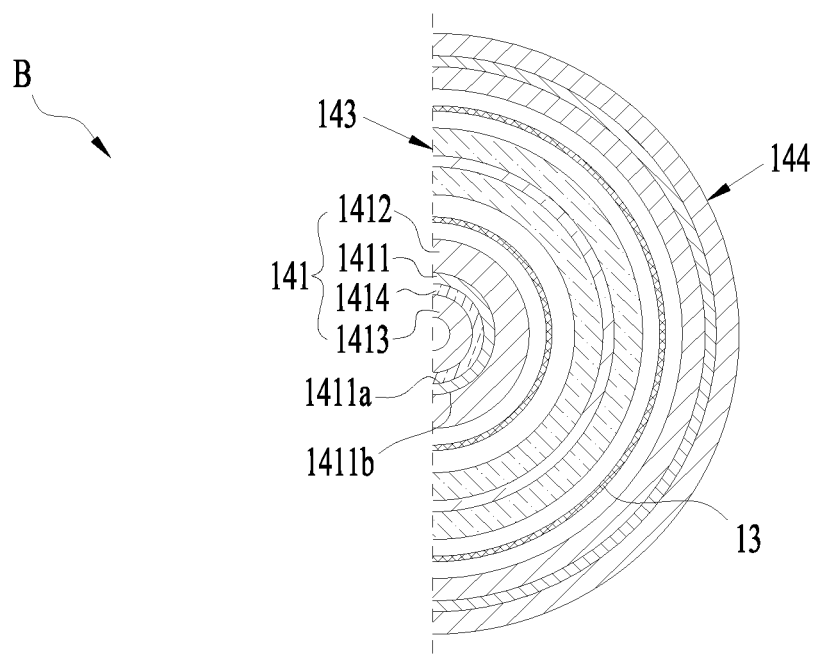
FIG. 12 is a locally enlarged diagram of a part of an electrode assembly in a bending zone according to some embodiments of this application.

FIG. 12 is a locally enlarged view of a part of an electrode assembly in a bending zone B according to some embodiments of this application. In some embodiments, referring to FIG. 12, the first bending portion 141 further includes a first conductive portion 1414, the first conductive portion 1414 is connected between the second active substance portion 1413 and the first inner surface 1411a, and the thickness of the first active substance portion 1412 is greater than or equal to a total thickness of the second active substance portion 1413 and the first conductive portion 1414. That is, providing the first conductive portion 1414 between the second active substance portion 1413 and a first current collector portion 1411, may make the thickness of the first active substance portion 1412 greater than or equal to the total thickness of the second active substance portion 1413 and the first conductive portion 1414, so that the thickness of the first active substance portion 1412 is greater than the thickness of the second active substance portion 1413.

When the negative electrode plate 11 is being produced, as long as the thickness of the first active substance portion 1412 is greater than or equal to the total thickness of the second active substance portion 1413 and the first conductive portion 1414, the thickness of the first active substance portion 1412 can be greater than the thickness of the second active substance portion 1413.

The first conductive portion 1414 can be a pure conductive coating. For example, the first conductive portion 1414 is a pure conductive coating including a binder and a conductive agent. The first conductive portion 1414 may alternatively be an active coating containing lithium ions. For example, the first conductive portion 1414 is an active coating that includes a lithium-rich material, a binder, and a conductive agent and that contains lithium ions. The first conductive portion 1414 may alternatively be an inactive coating containing lithium ions. For example, the first conductive portion 1414 is an inactive coating that includes a binder, a conductive agent, and lithium powder coated with lithium carbonate and that contains lithium ions.

Figure 13:
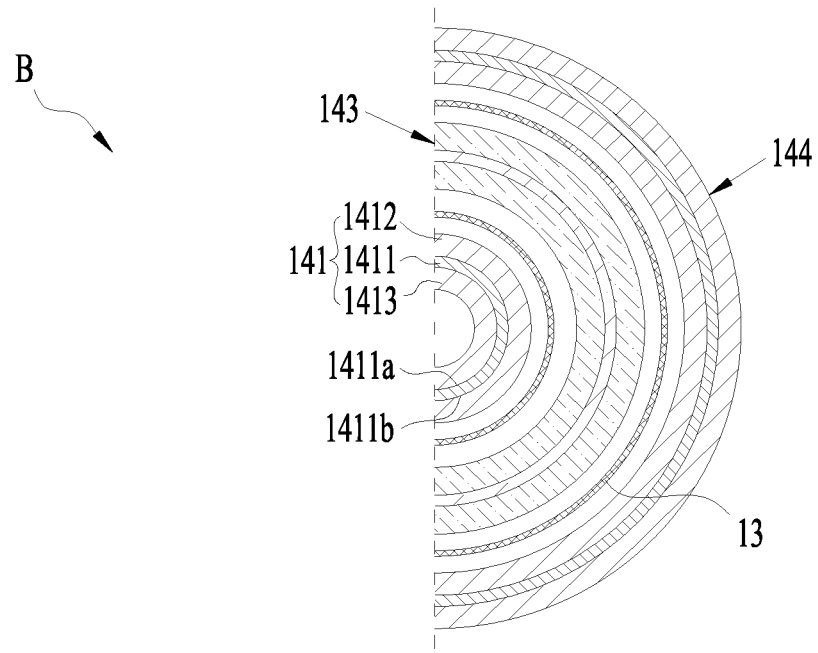
FIG. 13 is a locally enlarged diagram of a part of an electrode assembly in a bending zone according to some other embodiments of this application.

In some embodiments, there can be another manner to ensure that an active substance capacity per unit area in an outer part of the first bending portion 141 is greater than an active substance capacity per unit area in an inner part of the first bending portion 141. Referring to FIG. 13, FIG. 13 is a locally enlarged diagram of a part of an electrode assembly in a bending zone B according to some other embodiments of this application.

In some embodiments, a gram capacity of an active material in the first active substance portion 1412 is greater than a gram capacity of an active material in the second active substance portion 1413, making an active substance capacity per unit area of the first active substance portion 1412 greater than an active substance capacity per unit area of the second active substance portion 1413, so that the active substance capacity per unit area in the outer part of the first bending portion 141 is greater than the active substance capacity per unit area in the inner part of the first bending portion 141. In some embodiments, except for the gram capacity, the first active substance portion 1412 is the same as the second active substance portion 1413. For example, a thickness of the first active substance portion 1412 is the same as a thickness of the second active substance portion 1413, and a mass ratio of the active material of the first active substance portion 1412 to the first active substance portion 1412 is equal to a mass ratio of the active material of the second active substance portion 1413 to the second active substance portion 1413.

Gram capacity refers to a ratio of electric capacity released by the active material to a mass of the active material.

In this embodiment, the active material of the first active substance portion 1412 is different from the active material of the second active substance portion 1413. For example, the active material of the first active substance portion 1412 is a silicon compound, and the active material of the second active substance portion 1413 is graphite.

Optionally, the gram capacity of the active material in the first active substance portion 1412 is greater than the gram capacity of the active material in the second active substance portion 1413 by 0.5% to 20%.

For example, the gram capacity of the active material in the first active substance portion 1412 is greater than the gram capacity of the active material in the second active substance portion 1413 by 1.5% to 12%.

In some other embodiments, a mass ratio of the active material of the first active substance portion 1412 to the first active substance portion 1412 is greater than a mass ratio of the active material of the second active substance portion 1413 to the second active substance portion 1413, so that the active substance capacity per unit area in the outer part of the first bending portion 141 is greater than the active substance capacity per unit area in the inner part of the first bending portion 141. The first active substance portion 1412 and the second active substance portion 1413 each include an active material, a binder, and a conductive agent, and the mass ratio of the active material in the first active substance portion 1412 is increased, so that the active substance capacity per unit area in the outer part of the first bending portion 141 can be greater than the active substance capacity per unit area in the inner part of the first bending portion 141.

In some embodiments, the thickness of the first active substance portion 1412 is the same as the thickness of the second active substance portion 1413. An active material of the first active substance portion 1412 is the same as an active material of the second active substance portion 1413. A mass ratio of the active material in the first active substance portion 1412 to the first active substance portion 1412 is greater than a mass ratio of the active material of the second active substance portion 1413 to the second active substance portion 1413.

Figure 14:
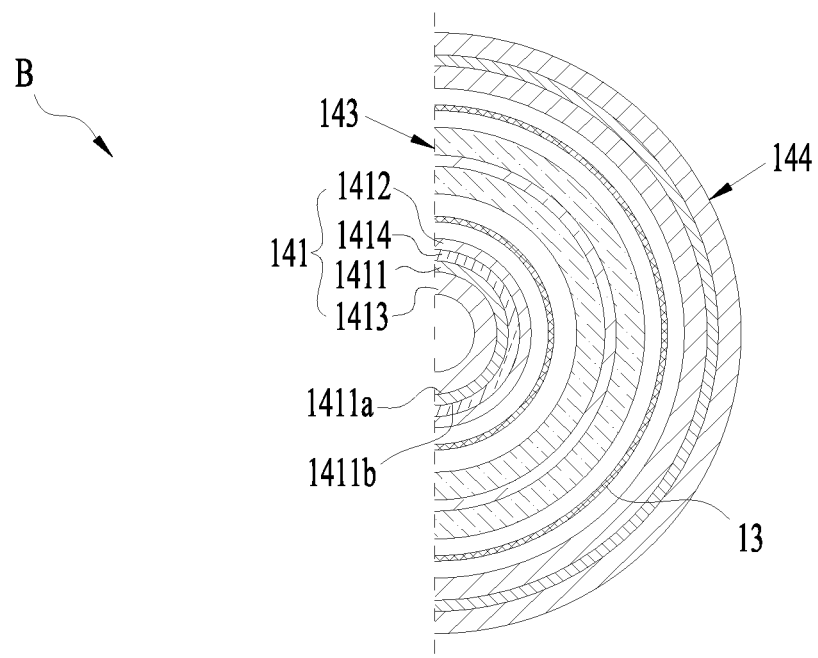
FIG. 14 is a locally enlarged diagram of a part of an electrode assembly in a bending zone according to still other embodiments of this application.

In some embodiments, referring to FIG. 14, FIG. 14 is a locally enlarged diagram of a part of an electrode assembly 10 in a bending zone B according to still other embodiments of this application. The first bending portion 141 further includes a first conductive portion 1414, the first conductive portion 1414 is connected between the first active substance portion 1412 and the first outer surface 1411b, and the first conductive portion 1414 includes an active material. The first conductive portion 1414 is an active coating containing lithium ions. For example, the first conductive portion 1414 is an active coating that includes a lithium-rich material, a binder, and a conductive agent and that contains lithium ions.

The thickness of the second active substance portion 1413 is greater than or equal to a total thickness of the first active substance portion 1412 and the first conductive portion 1414.

In some embodiments, except for the thickness, the first active substance portion 1412 is the same as the second active substance portion 1413. For example, an active material of the first active substance portion 1412 is the same as an active material of the second active substance portion 1413. A mass ratio of the active material of the first active substance portion 1412 to the first active substance portion 1412 is equal to a mass ratio of the active material of the second active substance portion 1413 to the second active substance portion 1413. The second active substance portion 1413 and the first active substance portion 1412 are formed by curing an active slurry with same composition.

In some embodiments, a gram capacity of the active material in the first active substance portion 1412 is less than a gram capacity of the active material in the first conductive portion 1414, an active material with a larger gram capacity is added to the first conductive portion 1414, and the active substance capacity per unit area in the outer part of the first bending portion 141 is increased, so that the active substance capacity per unit area in the outer part of the first bending portion 141 is greater than the active substance capacity per unit area in the inner part of the first bending portion 141.

In some embodiments, a mass ratio of the active material of the first conductive portion 1414 to the first conductive portion 1414 is equal to a mass ratio of the active material of the first active substance portion 1412 to the first active substance portion 1412.

In some other embodiments, a mass ratio of the active material of the first active substance portion 1412 to the first active substance portion 1412 is less than a mass ratio of the active material of the first conductive portion 1414 to the first conductive portion 1414, so that the active substance capacity per unit area in the outer part of the first bending portion 141 is greater than the active substance capacity per unit area in the inner part of the first bending portion 141. In some embodiments, the active material of the first active substance portion 1412 is the same as the active material of the first conductive portion 1414.

It should be noted that, in the embodiments of this application, there can be a plurality of manners to ensure that the active substance capacity per unit area in the outer part of the third bending portion 143 is equal to the active substance capacity per unit area in the inner part of the third bending portion 143. For example, an active material of a fifth active substance portion 1432 in the third bending portion 143 is the same as an active material of a sixth active substance portion 1433, and a thickness of the fifth active substance portion 1432 is equal to a thickness of the sixth active substance portion 1433. There can be a plurality of manners to ensure that the active substance capacity per unit area in the outer part of the fourth bending portion 144 is equal to the active substance capacity per unit area in the inner part of the fourth bending portion 144. For example, an active material of a seventh active substance portion 1442 in the fourth bending portion 144 is the same as an active material of an eighth active substance portion 1443, and a thickness of the seventh active substance portion 1442 is equal to a thickness of the eighth active substance portion 1443.

Figure 15:
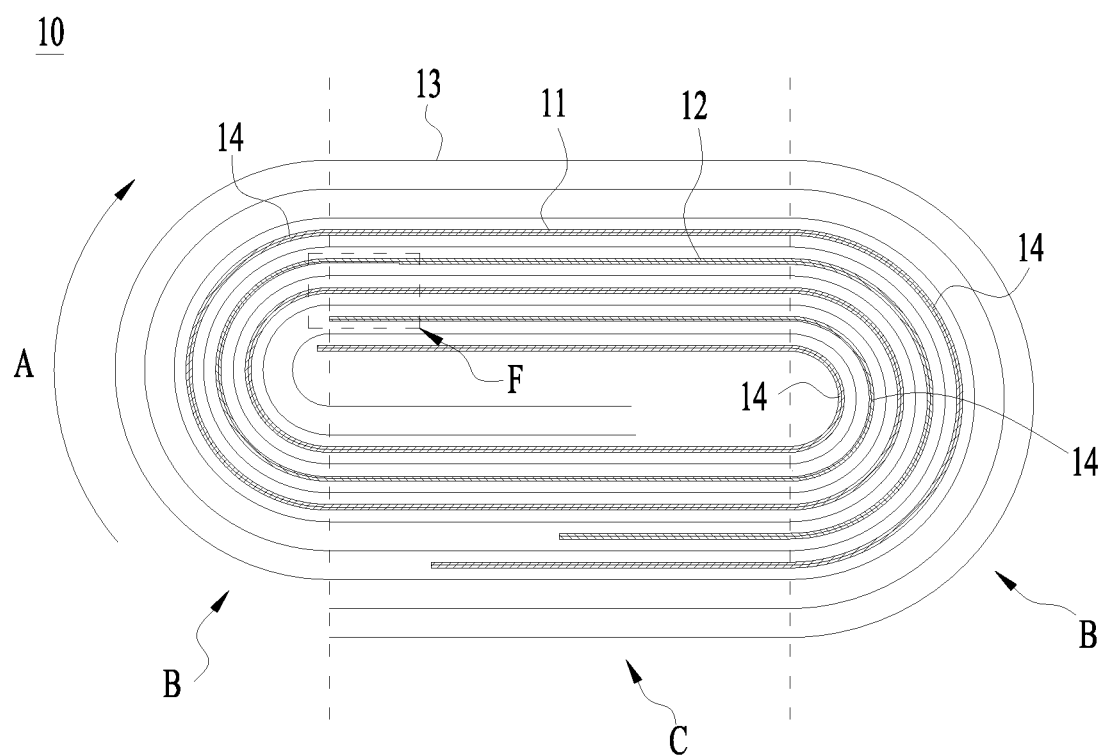
FIG. 15 is a schematic structural diagram of an electrode assembly according to yet other embodiments of this application.
Figure 16:
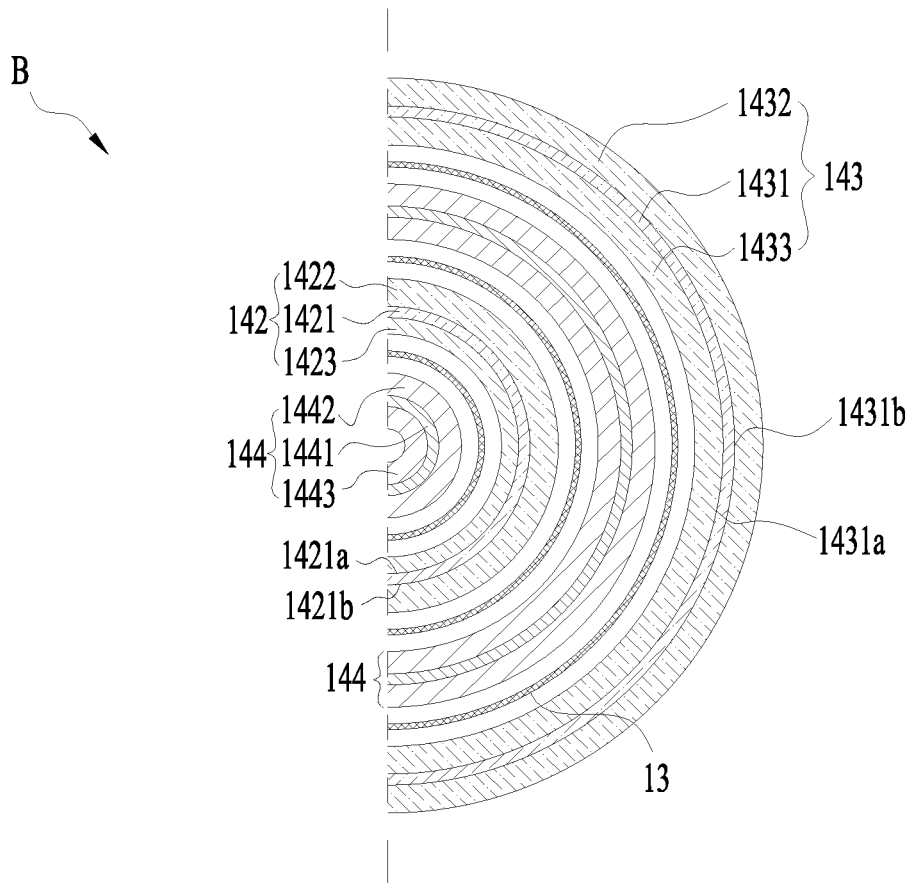
FIG. 16 is a locally enlarged schematic diagram of a bending zone of the electrode assembly shown in FIG. 15.
Figure 17:
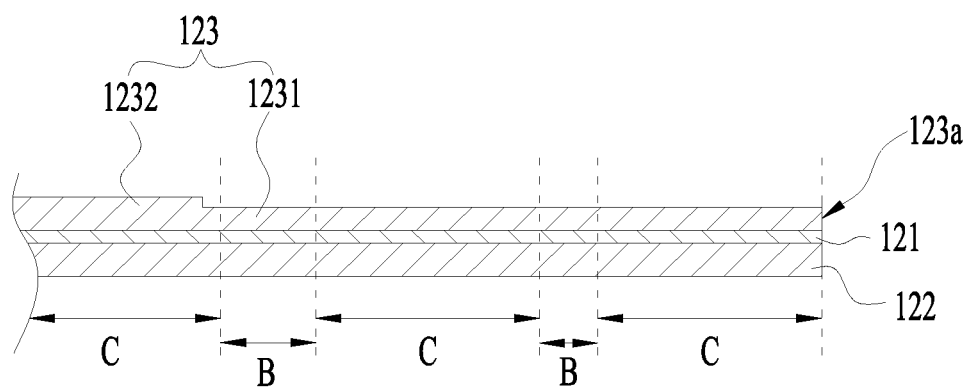
FIG. 17 is a local schematic diagram of the positive electrode plate shown in FIG. 15 in an unfolded state.
Figure 18:
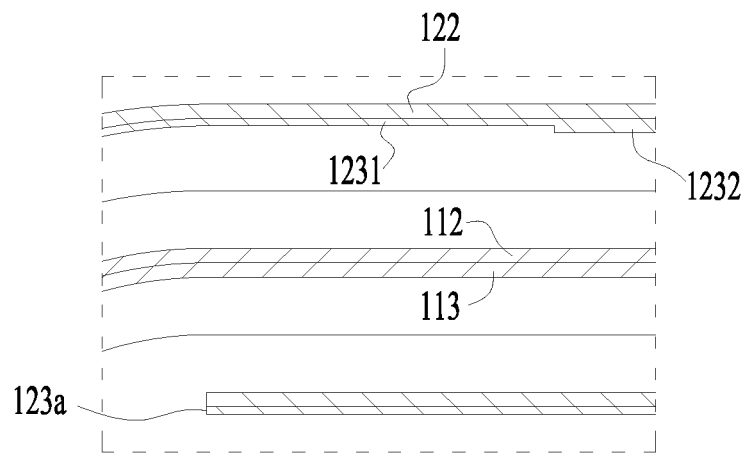
FIG. 18 is an enlarged schematic diagram of the electrode assembly shown in FIG. 15 at block F.

FIG. 15 is a schematic structural diagram of an electrode assembly 10 according to yet other embodiments of this application. FIG. 16 is a locally enlarged schematic diagram of a bending zone B of the electrode assembly 10 shown in FIG. 15. FIG. 17 is a local schematic diagram of the positive electrode plate 12 shown in FIG. 15 in an unfolded state. FIG. 18 is an enlarged schematic diagram of the electrode assembly 10 shown in FIG. 15 at block F.

In some embodiments, referring to FIG. 15 to FIG. 18, at least one innermost bending portion 14 in the positive electrode plate 12 is a second bending portion 142, and an active substance capacity per unit area in an outer part of the second bending portion 142 is greater than an active substance capacity per unit area in an inner part of the second bending portion 142. A bending portion 14 adjacent to the second bending portion 142 in the negative electrode plate 11 is a fourth bending portion 144, an active substance capacity per unit area in an outer part of the fourth bending portion 144 is equal to an active substance capacity per unit area in an inner part of the fourth bending portion 144.

Under the condition that the active substance capacity per unit area in the outer part of the second bending portion 142 is greater than the active substance capacity per unit area in the inner part of the second bending portion 142, the active substance capacity per unit area in the outer part of the fourth bending portion 144 can be equal to the active substance capacity per unit area in the inner part of the fourth bending portion 144, thereby simplifying a manufacturing process of the negative electrode plate 11.

The second bending portion 142 includes a second current collector portion 1421, a third active substance portion 1422, and a fourth active substance portion 1423. The third active substance portion 1422 and the fourth active substance portion 1423 are respectively provided on two sides of the second current collector portion 1421. Specifically, the second current collector portion 1421 has a second inner surface 1421a and a second outer surface 1421b that are arranged opposite each other in a thickness direction of the second current collector portion, where the third active substance portion 1422 is provided on the second outer surface 1421b, and the fourth active substance portion 1423 is provided on the second inner surface 1421a.

It can be understood that the second current collector portion 1421 is a part of the positive electrode current collector 121 (see FIG. 6) in the second bending portion 142, the third active substance portion 1422 is a part of the first positive electrode active substance layer 122 (see FIG. 6) in the second bending portion 142, and the fourth active substance portion 1423 is a part of the second positive electrode active substance layer 123 (see FIG. 6) in the second bending portion 142.

That the active substance capacity per unit area in the outer part of the second bending portion 142 is greater than the active substance capacity per unit area in the inner part of the second bending portion 142, means that an active substance capacity per unit area of the third active substance portion 1422 (outer part of the second bending portion 142) is greater than an active substance capacity per unit area of the fourth active substance portion 1423 (inner part of the second bending portion 142). The active substance capacity per unit area in the outer part of the second bending portion 142 is a ratio of an active substance capacity of the third active substance portion 1422 to an area of the second outer surface 1421b, and the active substance capacity per unit area in the inner part of the third bending portion 143 is a ratio of an active substance capacity of the fourth active substance portion 1423 to an area of the second inner surface 1421a.

In the positive electrode plate 12, all the bending portions 14 can be the second bending portions 142, or some bending portions 14 can be the second bending portions 142. If all the bending portions 14 in the positive electrode plate 12 are the second bending portions 142, for all the bending portions 14 in the positive electrode plate 12, an active substance capacity per unit area in an outer part is greater than an active substance capacity per unit area in an inner part. If only some bending portions 14 in the positive electrode plate 12 are the second bending portions 142, a structure in which an active substance capacity per unit area in an outer part is equal to an active substance capacity per unit area in an inner part can be used for a bending portion 14 other than the second bending portion 142 in the positive electrode plate 12. In the negative electrode plate 11, all the bending portions 14 can be fourth bending portions 144, or only some bending portions 14 can be the fourth bending portions 144.

In some embodiments, all the bending portions 14 in the negative electrode plate 11 are the fourth bending portions 144, thereby simplifying a manufacturing process of the negative electrode plate 11.

For a plurality of bending portions 14 of the negative electrode plate 11, in the direction from inside to outside, the radius is ascending and falling of coating off the plurality of bending portions 14 during bending is descending. Therefore, a structure in which an active substance capacity per unit area in an outer part is equal to an active substance capacity per unit area in an inner part can be used for some bending portions 14 of the positive electrode plate 12 that are close to the outer side.

In some embodiments, at least one innermost bending portion 14 in the positive electrode plate 12 is the second bending portion 142, at least one outermost bending portion 14 in the positive electrode plate 12 is a third bending portion 143, and an active substance capacity per unit area in an outer part of the third bending portion 143 is equal to an active substance capacity per unit area in an inner part of the third bending portion 143. In some embodiments, an active substance capacity per unit area in an outer part of the third bending portion 143 is equal to an active substance capacity per unit area in an outer part of the second bending portion 142.

In some embodiments, a plurality of bending portions 14 in the positive electrode plate that are sequentially arranged outward from an innermost part 12 are second bending portions 142. A bending portion 14 in the positive electrode plate 12 and located outward from the plurality of the second bending portions 142 is a third bending portion 143. A quantity of bending portions 14 in the positive electrode plate 12 is equal to a sum of a quantity of second bending portions 142 and a quantity of third bending portions 143. In some instances, in each bending zone B, a quantity of second bending portions 142 is two. The active substance capacity per unit area of the third bending portion 143 in the inner part does not need to be decreased, thereby ensuring a capacity of the electrode assembly 10.

In this embodiment of this application, there can be a plurality of manners to ensure that an active substance capacity per unit area in an outer part of the second bending portion 142 is greater than an active substance capacity per unit area in an inner part of the second bending portion 142.

In some embodiments, a thickness of the third active substance portion 1422 is greater than a thickness of the fourth active substance portion 1423, so that the active substance capacity per unit area in the outer part of the second bending portion 142 is greater than the active substance capacity per unit area in the inner part of the second bending portion 142. In some embodiments, except for thickness, the third active substance portion 1422 is the same as the fourth active substance portion 1423. For example, an active material of the third active substance portion 1422 in the second bending portion 142 is the same as an active material of the fourth active substance portion 1423, and a mass ratio of the active material of the third active substance portion 1422 to the third active substance portion 1422 is equal to a mass ratio of the active material of the fourth active substance portion 1423 to the fourth active substance portion 1423.

Under the condition that other parameters (such as type of active material and mass ratio of active material) are the same, the thickness of the third active substance portion 1422 is greater than the thickness of the fourth active substance portion 1423, making an active substance capacity per unit area of the third active substance portion 1422 greater than an active substance capacity per unit area of the fourth active substance portion 1423, so that the active substance capacity per unit area in the outer part of the second bending portion 142 is greater than the active substance capacity per unit area in the inner part of the second bending portion 142.

Both the active material of the third active substance portion 1422 and the active material of the fourth active substance portion 1423 can be lithium iron phosphate, lithium manganate oxide, ternary lithium, lithium cobalt oxide, or the like. The third active substance portion 1422 and the fourth active substance portion 1423 are formed by curing active slurries with the same composition.

Optionally, the thickness of the third active substance portion 1422 is greater than the thickness of the fourth active substance portion 1423 by 0.5% to 20%.

For example, the thickness of the third active substance portion 1422 is greater than the thickness of the fourth active substance portion 1423 by 1.5% to 12%.

In some embodiments, the second positive electrode active substance layer 123 includes a third portion 1231 and a fourth portion 1232 that are arranged along the winding direction A, where the third portion 1231 extends from a start end 123a of the second positive electrode active substance layer 123 in the winding direction A, the fourth portion 1232 is arranged with the third portion 1231 in succession in the winding direction A, and a thickness of the third portion 1231 is less than a thickness of the fourth portion 1232. The start end 123a of the second positive electrode active substance layer 123 is an inner end of the second positive electrode active substance layer 123 in the winding direction A. In some instances, the thickness of the fourth portion 1232 is equal to a thickness of the first positive electrode active substance layer 122.

In some embodiments, the fourth active substance portion 1423 is a part of the third portion 1231 located at the second bending portion 142, and the sixth active substance portion 1433 is a part of the fourth portion 1232 located at the third bending portion 143. The second positive electrode active substance layer 123 is provided as the third portion 1231 and the fourth portion 1232 that have different thicknesses, so that the active substance capacity per unit area in the outer part of the second bending portion 142 is greater than the active substance capacity per unit area in the inner part of the second bending portion 142 and the active substance capacity per unit area in the outer part of the third bending portion 143 is equal to the active substance capacity per unit area in the inner part of the third bending portion 143.

In some embodiments, the third portion 1231 is wound at least one turn in the winding direction A. That is, the second positive electrode active substance layer 123 is wound a plurality of turns in the winding direction A, and at least the first turn of the second positive electrode active substance layer 123 is the third portion 1231. A start point of the first turn is the start end 123a of the second positive electrode active substance layer 123, an end point of the first turn is located outward from the start end 123a of the second positive electrode active substance layer 123, and the start point and the end point of the first turn are flush in a thickness direction of the second positive electrode active substance layer 123. In this embodiment of this application, the third portion 1231 is wound at least one turn in the winding direction A, so that at least one innermost bending portion 14 in the positive electrode plate 12 is the second bending portion 142. Optionally, the third portion 1231 is wound two turns in the winding direction A.

Figure 19:
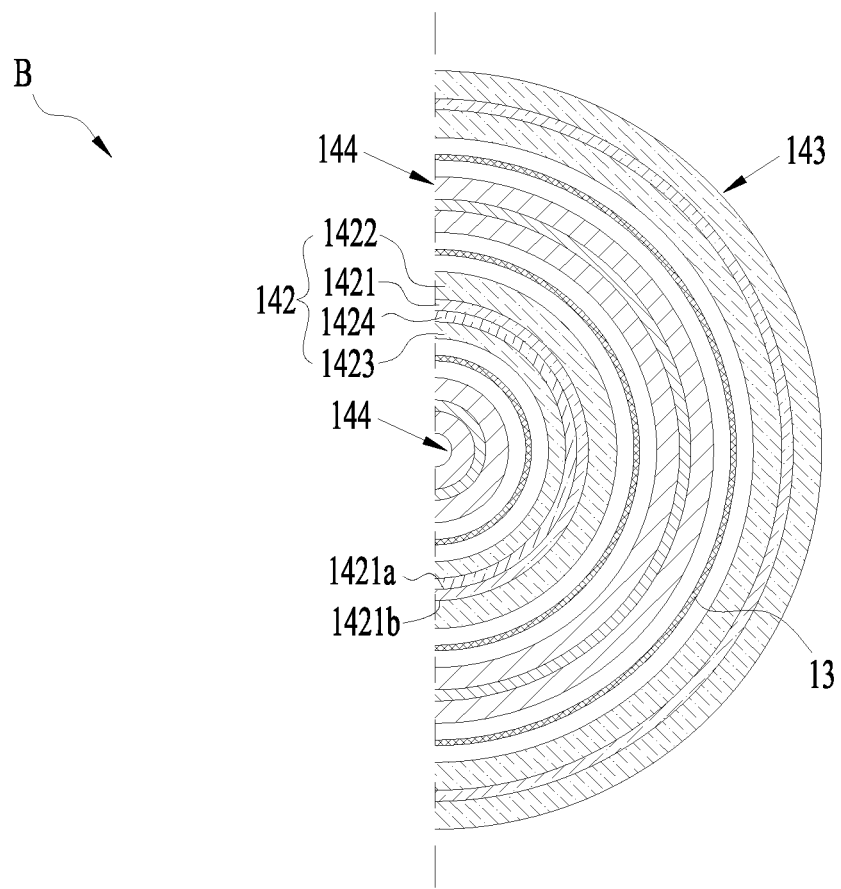
FIG. 19 is a locally enlarged diagram of a part of an electrode assembly in a bending zone according to yet other embodiments of this application.

In some embodiments, referring to FIG. 19, FIG. 19 is a locally enlarged diagram of a part of an electrode assembly in a bending zone B according to yet other embodiments of this application. The second bending portion 142 further includes a second conductive portion 1424, the second conductive portion 1424 is connected between a fourth active substance portion 1423 and a second inner surface 1421a, and a thickness of the third active substance portion 1422 is greater than or equal to a total thickness of the fourth active substance portion 1423 and the second conductive portion 1424. That is, a second conductive portion 1424 is provided between the fourth active substance portion 1423 and a second current collector portion 1421, and as a result, the thickness of the third active substance portion 1422 is greater than or equal to a total thickness of the fourth active substance portion 1423 and the second conductive portion 1424, so that the thickness of the third active substance portion 1422 is greater than the thickness of the fourth active substance portion 1423.

When the positive electrode plate 12 is produced, as long as the thickness of the third active substance portion 1422 is greater than or equal to a total thickness of the fourth active substance portion 1423 and the second conductive portion 1424, the thickness of the third active substance portion 1422 can be greater than the thickness of the fourth active substance portion 1423.

The second conductive portion 1424 can be a pure conductive coating. For example, the second conductive portion 1424 is a pure conductive coating including a binder and a conductive agent. The second conductive portion 1424 may alternatively be an active coating containing lithium ions. For example, the second conductive portion 1424 is an active coating that includes a lithium-rich material, a binder, and a conductive agent and that contains lithium ions. The second conductive portion 1424 may alternatively be an inactive coating containing lithium ions. For example, the second conductive portion 1424 is an inactive coating that includes a binder, a conductive agent, and lithium powder coated with lithium carbonate and that contains lithium ions.

Figure 20:
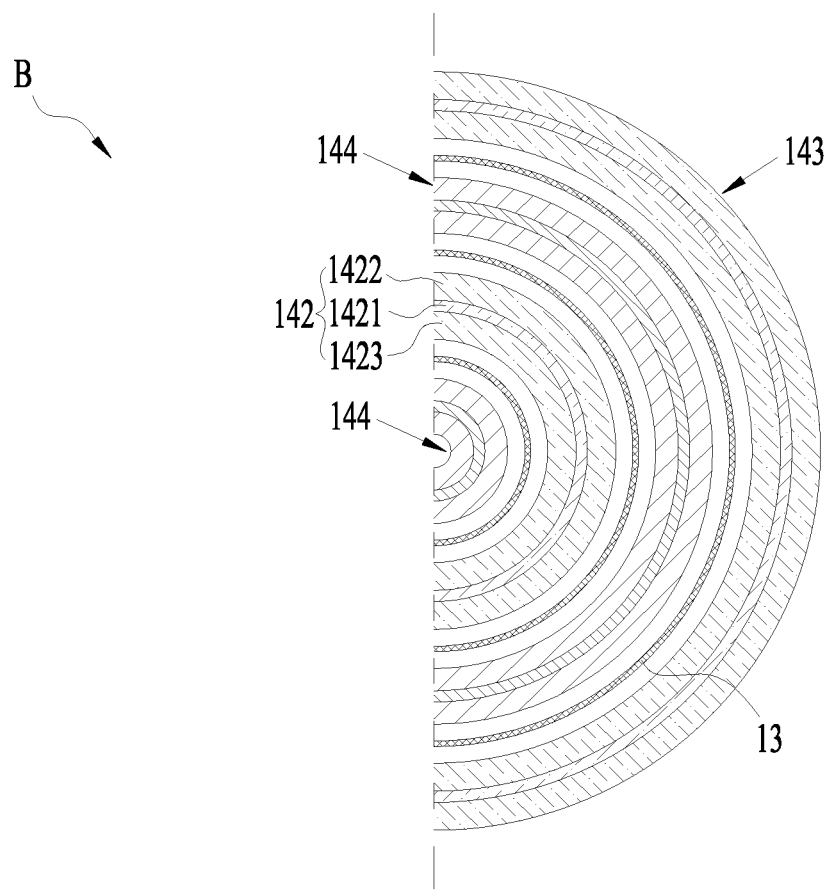
FIG. 20 is a locally enlarged diagram of a part of an electrode assembly in a bending zone according to still yet other embodiments of this application.

It should be noted that, in another embodiment, the fourth active substance portion 1423 is connected between the second conductive portion 1424 and a second inner surface 1421a In some embodiments, referring to FIG. 20, FIG. 20 is a locally enlarged diagram of a part of an electrode assembly in a bending zone B according to still yet other embodiments of this application.

In some embodiments, a gram capacity of an active material in the third active substance portion 1422 is greater than a gram capacity of an active material in the fourth active substance portion 1423, making an active substance capacity per unit area of the fourth active substance portion 1423 less than an active substance capacity per unit area of the third active substance portion 1422, so that the active substance capacity per unit area in the outer part of the second bending portion 142 is greater than the active substance capacity per unit area in the inner part of the second bending portion 142. In some embodiments, except for the gram capacity, the third active substance portion 1422 is the same as the fourth active substance portion 1423. For example, a thickness of the third active substance portion 1422 is equal to a thickness of the fourth active substance portion 1423. A mass ratio of the active material of the third active substance portion 1422 to the third active substance portion 1422 is equal to a mass ratio of the active material of the fourth active substance portion 1423 to the fourth active substance portion 1423.

In this embodiment, the active material of the third active substance portion 1422 can be different from the active material of the fourth active substance portion 1423. For example, the active material in the third active substance portion 1422 is ternary lithium, and the active material in the fourth active substance portion 1423 is lithium iron phosphate.

Optionally, the gram capacity of the active material in the third active substance portion 1422 is greater than the gram capacity of the active material in the fourth active substance portion 1423 by 0.5% to 20%.

For example, the gram capacity of the active material in the third active substance portion 1422 is greater than the gram capacity of the active material in the fourth active substance portion 1423 by 1.5% to 12%.

In some other embodiments, a mass ratio of the active material of the third active substance portion 1422 to the third active substance portion 1422 is greater than a mass ratio of the active material of the fourth active substance portion 1423 to the fourth active substance portion 1423, so that the active substance capacity per unit area in the outer part of the second bending portion 142 is greater than the active substance capacity per unit area in the inner part of the second bending portion 142. The third active substance portion 1422 and the fourth active substance portion 1423 each include an active material, a binder, and a conductive agent, and the mass ratio of the active material in the fourth active substance portion 1423 is decreased, so that the active substance capacity per unit area in the outer part of the second bending portion 142 can be greater than the active substance capacity per unit area in the inner part of the second bending portion 142.

In some embodiments, the thickness of the third active substance portion 1422 is the same as the thickness of the fourth active substance portion 1423. An active material of the third active substance portion 1422 is the same as an active material of the fourth active substance portion 1423. A mass ratio of the active material of the third active substance portion 1422 to the third active substance portion 1422 is greater than a mass ratio of the active material of the fourth active substance portion 1423 to the fourth active substance portion 1423.

Figure 21:
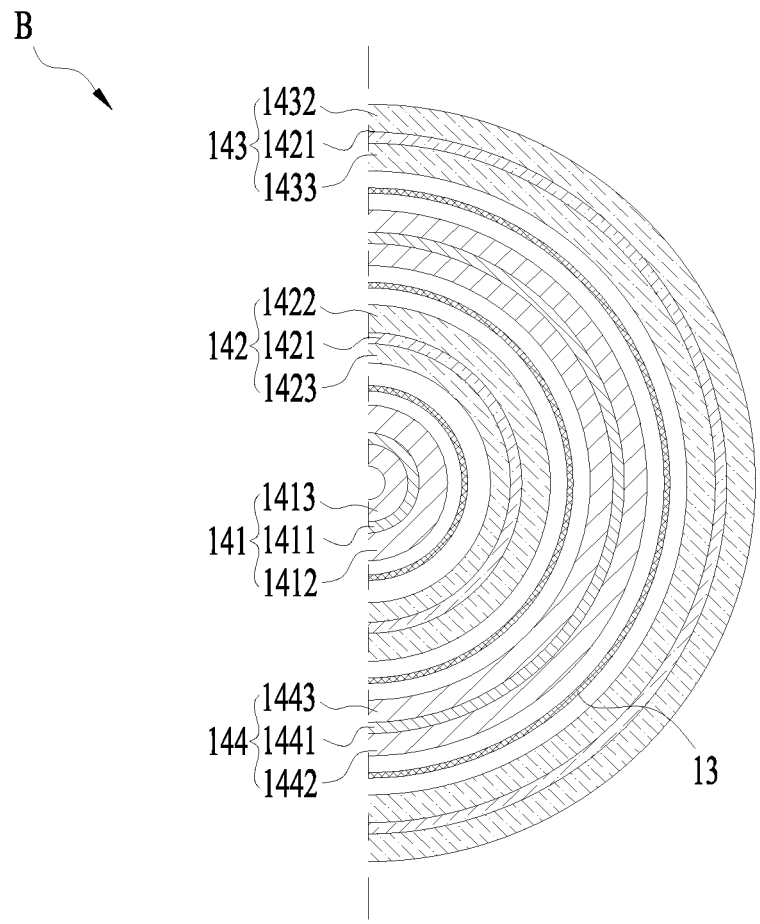
FIG. 21 is a locally enlarged diagram of a part of an electrode assembly in a bending zone according to further embodiments of this application.

In some embodiments, referring to FIG. 21, FIG. 21 is a locally enlarged diagram of a part of an electrode assembly in a bending zone B according to further embodiments of this application. At least one innermost bending portion 14 in the negative electrode plate 11 is a first bending portion 141, and an active substance capacity per unit area in an outer part of the first bending portion 141 is greater than an active substance capacity per unit area in an inner part of the first bending portion 141; or at least one innermost bending portion 14 in the positive electrode plate 12 is a second bending portion 142, and an active substance capacity per unit area in an outer part of the second bending portion 142 is greater than an active substance capacity per unit area in an inner part of the second bending portion 142.

In this embodiment, the thickness of the first active substance portion 1412 of the first bending portion 141 can be set to be greater than the thickness of the second active substance portion 1413, or the gram capacity of the active material of the first active substance portion 1412 of the first bending portion 141 can be set to be greater than the gram capacity of the active material in the second active substance portion 1413, or another manner can be used, so that the active substance capacity per unit area in the outer part of the first bending portion 141 is greater than the active substance capacity per unit area in the inner part of the first bending portion 141. Likewise, the thickness of the fourth active substance portion 1423 can be set to be less than that of the third active substance portion 1422 of the second bending portion 142, or the gram capacity of the active material of the fourth active substance portion 1423 can be set to be less than the gram capacity of the active material of the third active substance portion 1422 of the second bending portion 142, or another manner can be used, so that the active substance capacity per unit area in the outer part of the second bending portion 142 is greater than the active substance capacity per unit area in the inner part of the second bending portion 142.

For example, in FIG. 21, the thickness of the first active substance portion 1412 of the first bending portion 141 is greater than a thickness of the second active substance portion 1413, and the thickness of the third active substance portion 1422 of the second bending portion 142 is greater than the thickness of the fourth active substance portion 1423. In some embodiments, an active material of the first active substance portion 1412 of the first bending portion 141 is the same as an active material of the second active substance portion 1413. A mass ratio of the active material of the first active substance portion 1412 to the first active substance portion 1412 is equal to a mass ratio of the active material of the second active substance portion 1413 to the second active substance portion 1413. In some embodiments, an active material of the third active substance portion 1422 in the second bending portion 142 is the same as an active material of the fourth active substance portion 1423. A mass ratio of the active material of the third active substance portion 1422 to the third active substance portion 1422 is equal to a mass ratio of the active material of the fourth active substance portion 1423 to the fourth active substance portion 1423.

In some embodiments, the second bending portion 142 adjacent to the first bending portion 141 is arranged outward from the first bending portion 141.

When the active substance capacity per unit area in the inner part of the first bending portion 141 and the active substance capacity per unit area in the outer part of the second bending portion 142 satisfy design requirements, the active substance capacity per unit area in the outer part of the first bending portion 141 is greater than the active substance capacity per unit area in the inner part of the first bending portion 141, and the active substance capacity per unit area in the outer part of the second bending portion 142 is greater than the active substance capacity per unit area in the inner part of the second bending portion 142, thereby increasing a CB value of the outer part of the first bending portion 141, and reducing occurrence of lithium precipitation.

In this embodiment, in the negative electrode plate 11, all the bending portions 14 can be first bending portions 141, or some bending portions 14 cancan be the first bending portions 141. In the positive electrode plate 12, all the bending portions 14 cancan be second bending portions 142, or some bending portions 14 cancan be the second bending portions 142.

In some embodiments, some bending portions 14 in the negative electrode plate 11 are the first bending portions 141, and some bending portions 14 in the positive electrode plate 12 are the second bending portions 142. Specifically, a plurality of bending portions 14 in the negative electrode plate 11 that are sequentially arranged outward from an innermost part are first bending portions 141, and a bending portion 14 in the negative electrode plate 11 and located outward from the plurality of first bending portions 141 is a fourth bending portion 144. A plurality of bending portions 14 in the positive electrode plate 12 that are sequentially arranged outward from an innermost part are second bending portions 142, and a bending portion 14 in the positive electrode plate 12 and located outward from the plurality of the second bending portions 142 is a third bending portion 143. In some embodiments, the innermost bending portion 14 of the positive electrode plate 12 is located outward from the innermost bending portion 14 of the negative electrode plate 11, and there are two first bending portions 141 and two second bending portions 142.

Steps for testing the active substance capacity per unit area and the CB value are as follows:

Step 1: Test average discharge capacity of single-sided active substance layers of positive electrodes. Take the positive electrode plate in the foregoing embodiments, and process it using a punching die to small wafers each including a single-sided positive electrode active substance layer. Using metal lithium plates as counter electrodes, Celgard films as separators, EC+DMC+DEC solutions (with a volume ratio of ethylene carbonate to dimethyl carbonate to diethyl carbonate being 1:1:1) with $LiPF_6$ (1 mol/L) dissolved as electrolytes, assemble 6 identical CR2430 button cells in a glove box protected by argon. 1. Leave the assembled batteries standing for 12 hours. 2. Charge the batteries with a constant charge current of 0.1C until their voltage reaches an upper cut-off voltage $x_1$V, and then charge then with a constant voltage of $x_1$V until their current reaches 50 μA. 3. Leave the batteries standing for 5 minutes. 4. Finally, discharge the batteries with a constant current of 0.1C until their voltage reaches a lower cut-off voltage $y_1$V. 5. Leave the batteries standing for 5 minutes, and then repeat steps 2 to 5 and record their discharge capacities in the second cycle. An average discharge capacity of the 6 button cells is the average discharge capacity of single-sided active substance layers of the positive electrodes. For example, when the positive electrode active material is lithium iron phosphate (LFP), an upper cut-off voltage is $x_1$V=3.75 V, and a lower cut-off voltage is $y_1$V=2 V. When the positive electrode active material is lithium nickel cobalt manganese oxide (NCM), an upper cut-off voltage is $x_1$V=4.25 V, and a lower cut-off voltage is $y_1$V=2.8 V.

Step 2: Test average charge capacity of single-sided active substance layers of negative electrodes. Take the negative electrode plate in the foregoing embodiments, and process it using a punching die to small wafers that have the same area as the small positive electrode wafers in the step 1 and that each include a single-sided negative electrode membrane layer. Using metal lithium plates as counter electrodes, Celgard films as separators, and EC+DMC+DEC solutions (with a volume ratio of ethylene carbonate to dimethyl carbonate to diethyl carbonate being 1:1:1) with $LiPF_6$ (1 mol/L) dissolved as electrolytes, assemble 6 CR2430 button cells in a glove box protected by argon. 1. Leave the assembled batteries standing for 12 hours. 2. Discharge the batteries with a constant current of 0.05C until their voltage reaches a lower cut-off voltage $y_2$ mV. 3. Discharge the batteries with a constant current of 50 μA until the voltage reaches the lower cut-off voltage $y_2$ mV. 4. Leave the batteries standing for 5 minutes. 5. Then discharge the batteries with a constant current of 10 μA until the voltage reaches the lower cut-off voltage $y_2$ mV. 6. Leave the batteries standing for 5 minutes. 7. Charge the batteries with a constant current of 0.1C until the voltage finally reaches an upper cut-off voltage $x_2$V. 8. Leave the batteries standing for 5 minutes, and then repeat steps 2 to 8 and record their charge capacities in the second cycle. An average charge capacity of 6 button cells is the average charge capacity of single-sided membrane layers of the negative electrodes. For example, when the negative electrode active material is graphite, the upper cut-off voltage is $x_2$V=2 V, and a lower cut-off voltage is $y_2$V=5 mV. When the negative electrode active material is silicon, an upper cut-off voltage is $x_2$V=2 V, and a lower cut-off voltage is $y_2$V=5 mV.

Step 3: Calculate the CB value according to this equation: CB value=average charge capacity (mAh) of single-sided active substance layers of the negative electrodes/average discharge capacity (mAh) of single-sided active substance layers of positive electrodes.

Figure 22:
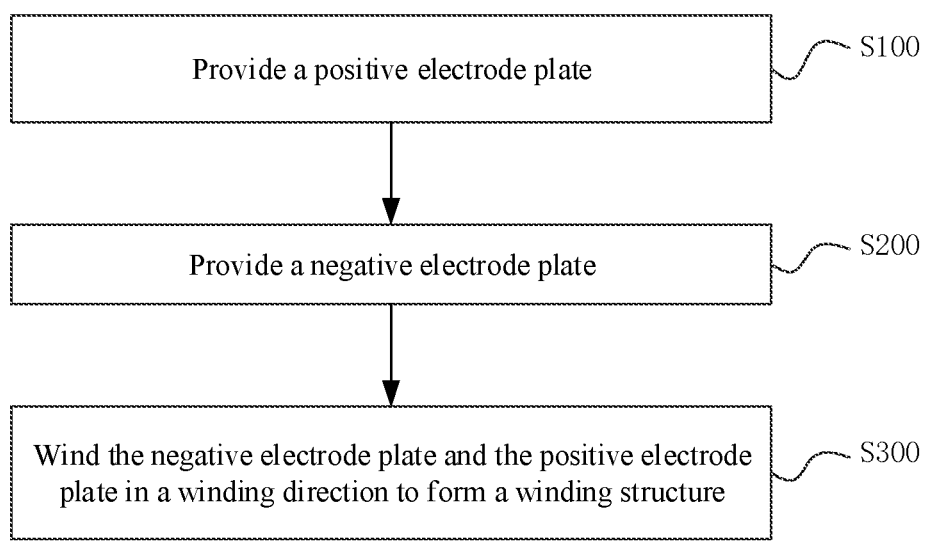
FIG. 22 is a flowchart of a manufacturing method of an electrode assembly according to some embodiments of this application.
Figure 23:
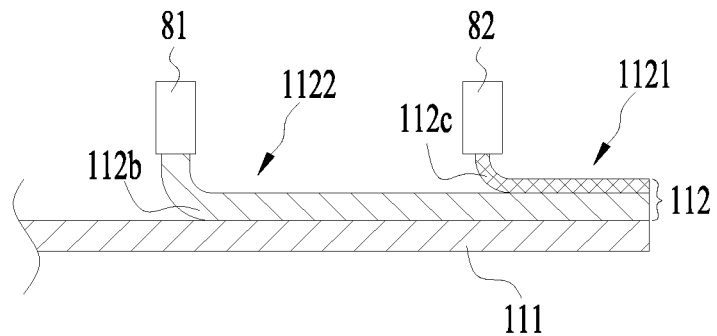
FIG. 23 is a schematic diagram of a negative electrode plate in a forming process according to some embodiments of this application.
Figure 24:
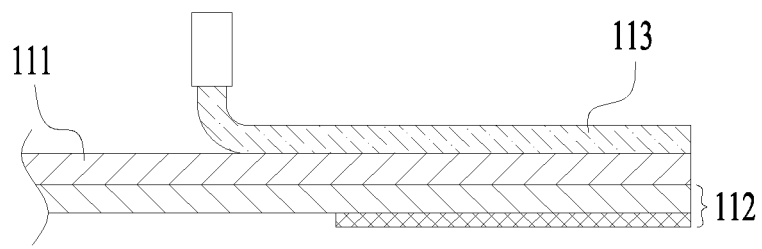
FIG. 24 is another schematic diagram of a negative electrode plate in a forming process according to some embodiments of this application.
Figure 25:
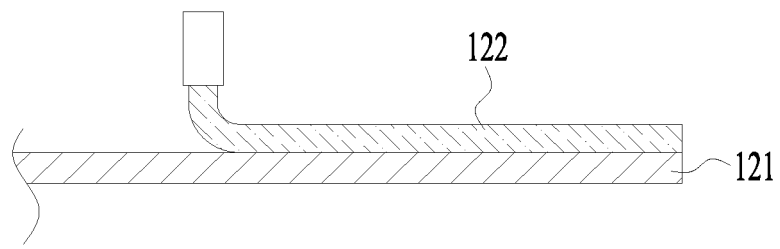
FIG. 25 is a schematic diagram of a positive electrode plate in a forming process according to some embodiments of this application.
Figure 26:
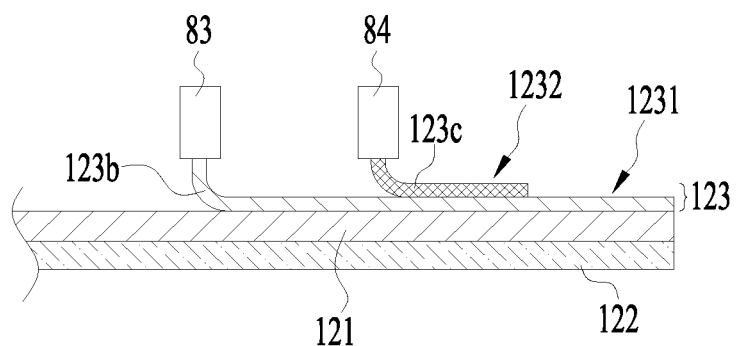
FIG. 26 is another schematic diagram of a positive electrode plate in a forming process according to some embodiments of this application.

FIG. 22 is a flowchart of a manufacturing method of an electrode assembly according to some embodiments of this application. FIG. 23 is a schematic diagram of a negative electrode plate in a forming process according to some embodiments of this application. FIG. 24 is another schematic diagram of a negative electrode plate in a forming process according to some embodiments of this application. FIG. 25 is a schematic diagram of a positive electrode plate in a forming process according to some embodiments of this application. FIG. 26 is another schematic diagram of a positive electrode plate in a forming process according to some embodiments of this application.

Referring to FIG. 22, a manufacturing method of an electrode assembly includes the following steps:

S100: Provide a positive electrode plate.

S200: Provide a negative electrode plate.

S300: Wind the negative electrode plate and the positive electrode plate in a winding direction to form a winding structure.

The winding structure includes a bending zone, and the negative electrode plate and the positive electrode plate each include a plurality of bending portions located in the bending zone. At least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion.

In some embodiments, a separator for separating the positive electrode plate and the negative electrode plate is further provided, and a first electrode plate, the separator, and a second electrode plate are wound in a winding direction to form a winding structure.

In some embodiments, step S200 includes:

S210: Provide a negative electrode current collector 111.

S220: Apply a first negative electrode active substance layer 112 on a surface of the negative electrode current collector 111 with reference to FIG. 23.

S230: Apply a second negative electrode active substance layer 113 on another surface of the negative electrode current collector 111 with reference to FIG. 24.

In the winding structure, the first negative electrode active substance layer 112 is located outward from the negative electrode current collector 111, and the second negative electrode active substance layer 113 is located inward from the negative electrode current collector 111; the first negative electrode active substance layer 112 includes a first portion 1121 and a second portion 1122 that are arranged along the winding direction A, where the first portion 1121 extends from a start end of the first negative electrode active substance layer 112 in the winding direction A, the second portion 1122 is arranged with the first portion 1121 in succession in the winding direction A, a thickness of the first portion 1121 is greater than a thickness of the second portion 1122, and the thickness of the second portion 1122 is equal to a thickness of the second negative electrode active substance layer 113; and at least a part of the first portion 1121 is located at the first bending portion.

Referring to FIG. 23, step S220 includes:

S221: Apply a negative electrode active slurry on the surface of the negative electrode current collector 111 to form a first active coating 112b.

S222: Apply the negative electrode active slurry on a partial zone of a surface of the first active coating 112b facing away from the negative electrode current collector 111 to form a second active coating 112c.

S223: The first active coating 112b and the second active coating 112c form the first negative electrode active substance layer 112 after curing.

A part of the first active coating 112b coated with the second active coating 112c and the second active coating 112c form the first portion 1121 after curing, and a part of the first active coating 112b uncoated with the second active coating 112c forms the second portion 1122 after curing.

During conveying by a conveyor belt, the negative electrode current collector 111 passes through a negative electrode coating device. The negative electrode coating device includes a first coating nozzle 81 and a second coating nozzle 82. When the negative electrode current collector 111 passes through the first coating nozzle 81, the first coating nozzle 81 continuously coats a surface of the negative electrode current collector 111 to form the first active coating 112b. When the negative electrode current collector 111 coated with the first active coating 112b passes through the second coating nozzle 82, on/off time of the second coating nozzle 82 can be controlled, so that the second active coating 112c is formed in a defined zone on a surface of the first active coating 112b facing away from the negative electrode current collector 111. This dual-layer coating manner is easy to control, helping simplify a coating process.

In some embodiments, step S100 includes:

S110: Provide a positive electrode current collector 121.

S120: Apply a first positive electrode active substance layer 122 on a surface of the positive electrode current collector 121 with reference to FIG. 25.

S130: Apply a second positive electrode active substance layer 123 on another surface of the positive electrode current collector 121 with reference to FIG. 26.

In the winding structure, the first positive electrode active substance layer 122 is located outward from the positive electrode current collector 121, and the second positive electrode active substance layer 123 is located inward from the positive electrode current collector 121; the second positive electrode active substance layer 123 includes a third portion 1231 and a fourth portion 1232 that are arranged along the winding direction A, where the third portion 1231 extends from a start end of the second positive electrode active substance layer 123 in the winding direction A, the fourth portion 1232 is arranged with the third portion 1231 in succession in the winding direction A, a thickness of the third portion 1231 is less than a thickness of the fourth portion 1232, and the thickness of the fourth portion 1232 is equal to a thickness of the first positive electrode active substance layer 122; and at least a part of the third portion 1231 is located at the second bending portion 142.

In some embodiments, referring to FIG. 26, step S130 includes:

S131: Apply a positive electrode active slurry on another surface of the positive electrode current collector 121 to form a third active coating 123b.

S132: Apply the positive electrode active slurry on a partial zone of a surface of the third active coating 123b facing away from the positive electrode current collector 121 to form a fourth active coating 123c.

S133: The third active coating 123b and the fourth active coating 123c form the second positive electrode active substance layer 123 after curing.

A part of the third active coating 123b uncoated with the fourth active coating 123c forms the third portion 1231 after curing, and a part of the third active coating 123b coated with the fourth active coating 123c and the fourth active coating 123c form the fourth portion 1232 after curing.

During conveying by a conveyor belt, the positive electrode current collector 121 passes through a positive electrode coating device. The positive electrode coating device includes a third coating nozzle 83 and a fourth coating nozzle 84. When the positive electrode current collector 121 passes through the third coating nozzle 83, the third coating nozzle 83 continuously coats another surface of the positive electrode current collector 121 to form the third active coating 123b. When the positive electrode current collector 121 coated with the third active coating 123b passes through the fourth coating nozzle 84, on/off time of the fourth coating nozzle 84 can be controlled, so that the fourth active coating 123c is formed in a defined zone on a surface of the third active coating 123b facing away from the positive electrode current collector 121. This dual-layer coating manner is easy to control, helping simplify a coating process.

It should be noted that, for a related structure of the electrode assembly manufactured using the foregoing manufacturing method of an electrode assembly, refer to the electrode assembly provided in the foregoing embodiments.

When being assembled using the foregoing manufacturing method of an electrode assembly, the electrode assembly is not necessarily assembled in an order of the foregoing steps. To be specific, the steps can be performed in the order described in the embodiments, or the steps can be performed in an order different from that described in the embodiments, or several steps can be performed at the same time. For example, step S100 and step S200 are not performed in a particular order, or can be performed at the same time; step S230 can be performed, before step S220; or step S130 can be performed before step S120.

Figure 27:
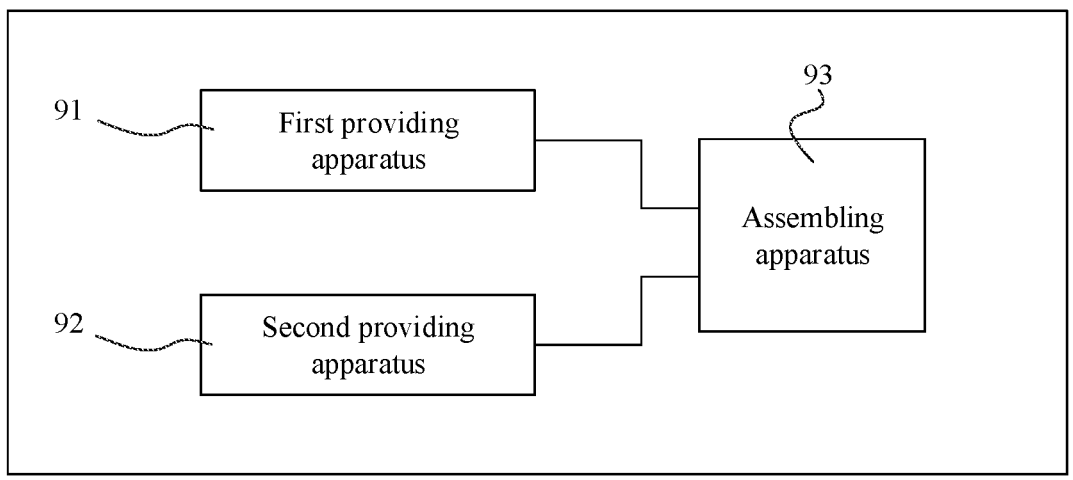
FIG. 27 is a schematic block diagram of a manufacturing system of an electrode assembly according to some embodiments of this application.

Referring to FIG. 27, FIG. 27 is a schematic block diagram of a manufacturing system of an electrode assembly according to some embodiments of this application. The manufacturing system of an electrode assembly includes: a first providing apparatus 91, configured to provide a positive electrode plate; a second providing apparatus 92, configured to provide a negative electrode plate; and an assembling apparatus 93, configured to wind the negative electrode plate and the positive electrode plate in a winding direction to form a winding structure.

Herein, the winding structure includes a bending zone, and the negative electrode plate and the positive electrode plate each include a plurality of bending portions located in the bending zone; and at least one innermost bending portion in the negative electrode plate is a first bending portion, and an active substance capacity per unit area in an outer part of the first bending portion is greater than an active substance capacity per unit area in an inner part of the first bending portion; and/or at least one innermost bending portion in the positive electrode plate is a second bending portion, and an active substance capacity per unit area in an outer part of the second bending portion is greater than an active substance capacity per unit area in an inner part of the second bending portion.

In some embodiments, the manufacturing system further includes a third providing apparatus (not shown), and the third providing apparatus is configured to provide a separator for separating the positive electrode plate from the negative electrode plate. The assembling apparatus 93 is configured to wind a first electrode plate, the separator, and a second electrode plate in a winding direction to form a winding structure.

For a related structure of the electrode assembly manufactured in the foregoing manufacturing system, refer to the electrode assembly provided in the foregoing embodiments.

It should be noted that, without conflicts, the embodiments and features in the embodiments in this application can be mutually combined.

In conclusion, it should be noted that the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An electrode assembly, comprising a negative electrode plate and a positive electrode plate,
   wherein the negative electrode plate and the positive electrode plate are wound in a winding direction to form a winding structure, and the winding structure comprises a bending zone; and the negative electrode plate and the positive electrode plate each comprise a plurality of bending portions located in the bending zone;
   wherein the negative electrode plate comprises a negative electrode current collector a first negative electrode active substance layer and a second negative electrode active substance layer, the first negative electrode active substance layer is located outward from the negative electrode current collector, and the second negative electrode active substance layer is located inward from the negative electrode current collector;
   the first negative electrode active substance layer comprises a first portion and a second portion that are arranged along the winding direction, the first portion extends from a start end of the first negative electrode active substance layer in the winding direction, the second portion is arranged with the first portion in succession in the winding direction, and a thickness of the first portion is greater than a thickness of the second portion; and
   at least one innermost bending portion in the negative electrode plate is a first bending portion, and an active substance capacity per unit area in an outer part of the first bending portion is greater than an active substance capacity per unit area in an inner part of the first bending portion;
   and/or
   wherein the positive electrode plate comprises a positive electrode current collector, a first positive electrode active substance layer, and a second positive electrode active substance layer, the first positive electrode active substance layer is located outward from the positive electrode current collector, and the second positive electrode active substance layer is located inward from the positive electrode current collector;
   the second positive electrode active substance layer comprises a third portion and a fourth portion that are arranged along the winding direction, the third portion extends from a start end of the second positive electrode active substance layer in the winding direction, the fourth portion is arranged with the third portion in succession in the winding direction, and a thickness of the third portion is less than a thickness of the fourth portion; and at least one innermost bending portion in the positive electrode plate is a second bending portion, and an active substance capacity per unit area in an outer part of the second bending portion is greater than an active substance capacity per unit area in an inner part of the second bending portion.

2. The electrode assembly according to claim 1, wherein at least one innermost bending portion in the negative electrode plate is the first bending portion, at least one innermost bending portion in the positive electrode plate is the second bending portion, and the second bending portion adjacent to the first bending portion is arranged outward from the first bending portion.

3. The electrode assembly according to claim 1, wherein at least one innermost bending portion in the negative electrode plate is the first bending portion;

a bending portion in the positive electrode plate and adjacent to the first bending portion is a third bending portion; and an active substance capacity per unit area in an outer part of the third bending portion is equal to an active substance capacity per unit area in an inner part of the third bending portion.

4. The electrode assembly according to claim 1, wherein at least one innermost bending portion in the positive electrode plate is the second bending portion;

a bending portion in the negative electrode plate and adjacent to the second bending portion is a fourth bending portion; and an active substance capacity per unit area in an outer part of the fourth bending portion is equal to an active substance capacity per unit area in an inner part of the fourth bending portion.

5. The electrode assembly according to claim 1, wherein the second bending portion comprises a second current collector portion, a third active substance portion, and a fourth active substance portion; and the second current collector portion has a second inner surface and a second outer surface that are arranged opposite each other in a thickness direction of the second current collector portion, wherein the third active substance portion is provided on the second outer surface, and the fourth active substance portion is provided on the second inner surface.

6. The electrode assembly according to claim 5, wherein a thickness of the third active substance portion is greater than a thickness of the fourth active substance portion.

7. The electrode assembly according to claim 6, wherein the second bending portion further comprises a second conductive portion, wherein the second conductive portion is connected between the fourth active substance portion and the second inner surface, and the thickness of the third active substance portion is greater than or equal to a total thickness of the fourth active substance portion and the second conductive portion.

8. The electrode assembly according to claim 5, wherein a gram capacity of an active material in the third active substance portion is greater than a gram capacity of an active material in the fourth active substance portion.

9. The electrode assembly according to claim 5, wherein a mass ratio of an active material in the third active substance portion to the third active substance portion is greater than a mass ratio of an active material in the fourth active substance portion to the fourth active substance portion.

10. The electrode assembly according to claim 1, wherein the thickness of the second portion is equal to a thickness of the second negative electrode active substance layer.

11. The electrode assembly according to claim 1, wherein the first portion is wound at least one turn in the winding direction.

12. The electrode assembly according to claim 1, wherein the thickness of the fourth portion is equal to a thickness of the first positive electrode active substance layer.

13. The electrode assembly according to claim 1, wherein the third portion is wound at least one turn in the winding direction.

14. The electrode assembly according to claim 1, wherein the plurality of bending portions in the negative electrode plate that are sequentially arranged outward from an innermost part are first bending portions; and a bending portion in the negative electrode plate and located outward from the plurality of first bending portions is a fourth bending portion, and an active substance capacity per unit area in an outer part of the fourth bending portion is equal to an active substance capacity per unit area in an inner part of the fourth bending portion.

15. The electrode assembly according to claim 1, wherein the plurality of bending portions in the positive electrode plate that are sequentially arranged outward from an innermost part are second bending portions; and a bending portion in the positive electrode plate and located outward from the plurality of second bending portions is a third bending portion, and an active substance capacity per unit area in an outer part of the third bending portion is equal to an active substance capacity per unit area in an inner part of the third bending portion.

16. A battery cell, comprising a housing and the electrode assembly according to claim 1, wherein the electrode assembly is accommodated in the housing.

17. A battery, comprising a case and the battery cell according to claim 16, wherein the battery cell is accommodated in the case.

18. An electric device, comprising the battery according to claim 17, wherein the battery is configured to supply electric energy.

* * * * *